United States Patent
Naujok et al.

(10) Patent No.: US 12,039,536 B2
(45) Date of Patent: Jul. 16, 2024

(54) TRANSACTION AUTHENTICATION, AUTHORIZATION, AND/OR AUDITING UTILIZING SUBSCRIBER-SPECIFIC BEHAVIORS

(71) Applicant: Prove Identity, Inc., New York, NY (US)

(72) Inventors: Jeffrey Robert Naujok, Colorado Springs, CO (US); Christopher Cunningham, Highlands Ranch, CO (US); Prashant Janakrai Desai, New York, NY (US)

(73) Assignee: Prove Identity, Inc., New York, NY (US)

( * ) Notice: Subject to any disclaimer, the term of this patent is extended or adjusted under 35 U.S.C. 154(b) by 17 days.

(21) Appl. No.: 17/081,685

(22) Filed: Oct. 27, 2020

(65) Prior Publication Data
US 2022/0129900 A1    Apr. 28, 2022

(51) Int. Cl.
*G06Q 20/32*    (2012.01)
*G06Q 20/40*    (2012.01)
(Continued)

(52) U.S. Cl.
CPC ..... *G06Q 20/4016* (2013.01); *G06Q 20/3223* (2013.01); *G06Q 20/3224* (2013.01);
(Continued)

(58) Field of Classification Search
CPC ........... G06Q 20/4016; G06Q 20/3223; G06Q 20/3224; G06Q 20/4014; H04W 4/029; H04W 12/72
See application file for complete search history.

(56) References Cited

U.S. PATENT DOCUMENTS

| 7,181,197 B2 | 2/2007 | Clayton |
| 7,221,749 B2 | 5/2007 | Chiczewski |

(Continued)

FOREIGN PATENT DOCUMENTS

| EP | 2490128 A1 | 8/2012 |
| EP | 3043575 A1 | 7/2016 |

(Continued)

OTHER PUBLICATIONS

U.S. Appl. No. 17/372,493 / Patent Application filed Jul. 11, 2021, 98 pages, Doc 1753.

(Continued)

*Primary Examiner* — Bruce I Ebersman
*Assistant Examiner* — Matthew Cobb
(74) *Attorney, Agent, or Firm* — Husch Blackwell LLP; Bryan D. Stewart; Matthew Francis

(57) ABSTRACT

Briefly, example methods, apparatuses, and/or articles of manufacture are disclosed that may be implemented, in whole or in part, using one or more computing devices to receive at a server device coupled to a communications network, a first signal indicating that a subscriber of a mobile device has initiated a transaction. The method may continue with accessing a data store to determine occurrence of one or more deterministic events with respect to the mobile device and accessing the data store to determine one or more behavior norms specific to the subscriber with respect to the mobile device. The method may additionally include generating, by the server coupled to the communications network, a second signal indicating an authorization status of the transaction, the authorization status being dependent on the occurrence of the one or more deterministic events in relation to the one or more behavior norms.

20 Claims, 6 Drawing Sheets

(51) Int. Cl.
*H04W 4/029* (2018.01)
*H04W 12/72* (2021.01)
(52) U.S. Cl.
CPC ........ *G06Q 20/4014* (2013.01); *H04W 4/029* (2018.02); *H04W 12/72* (2021.01)

(56) References Cited

U.S. PATENT DOCUMENTS

| | | | |
|---|---|---|---|
| 10,878,414 | B2 | 12/2020 | Pillai et al. |
| 11,223,943 | B2 | 1/2022 | Desai |
| 2008/0141037 | A1* | 6/2008 | Cheston .................. G06F 21/31 713/184 |
| 2008/0261561 | A1 | 10/2008 | Gehrmann |
| 2010/0100939 | A1 | 4/2010 | Mahaffey |
| 2011/0019811 | A1 | 1/2011 | May |
| 2011/0151843 | A1 | 6/2011 | Deuel |
| 2012/0115545 | A1* | 5/2012 | Middleton ........ H04M 1/72448 455/558 |
| 2012/0303455 | A1* | 11/2012 | Busch .................... H04W 4/029 705/14.57 |
| 2013/0003958 | A1 | 1/2013 | Brown |
| 2013/0024375 | A1* | 1/2013 | Choudhuri ............. G06Q 40/00 705/44 |
| 2014/0164178 | A1 | 6/2014 | Adjaoute |
| 2014/0199962 | A1* | 7/2014 | Mohammed ...... H04M 15/8033 455/406 |
| 2014/0247144 | A1* | 9/2014 | Proud .................. A61B 5/0022 340/870.02 |
| 2015/0026027 | A1* | 1/2015 | Priess .................... G06Q 10/04 705/35 |
| 2015/0033337 | A1 | 1/2015 | Baikalov |
| 2015/0039513 | A1* | 2/2015 | Adjaoute ........... G06Q 30/0609 705/44 |
| 2015/0178715 | A1 | 6/2015 | Buhrmann |
| 2015/0230088 | A1 | 8/2015 | Barkan |
| 2015/0269578 | A1 | 9/2015 | Subramanian |
| 2017/0053107 | A1* | 2/2017 | Nahari .................... G06F 21/34 |
| 2017/0103388 | A1 | 4/2017 | Pillai et al. |
| 2017/0289796 | A1 | 10/2017 | Raleigh |
| 2017/0300881 | A1 | 10/2017 | Weinflash et al. |
| 2018/0212971 | A1 | 7/2018 | Costa |
| 2019/0347431 | A1 | 11/2019 | Nair |
| 2020/0059860 | A1 | 2/2020 | Huang |
| 2020/0104876 | A1* | 4/2020 | Chintakindi ......... A61B 5/0022 |
| 2020/0260258 | A1 | 8/2020 | Desai |
| 2021/0150523 | A1 | 5/2021 | Pillai et al. |
| 2022/0012743 | A1 | 1/2022 | Snell |
| 2022/0159449 | A1 | 5/2022 | Desai |
| 2022/0174478 | A1 | 6/2022 | Naujok |

FOREIGN PATENT DOCUMENTS

| | | |
|---|---|---|
| EP | 3487154 A1 | 5/2019 |
| WO | WO2020167977 | 8/2020 |
| WO | WO2022015611 | 1/2022 |

OTHER PUBLICATIONS

U.S. Appl. No. 17/372,493 / Filing Receipt dated Jul. 27, 2021, 3 pages, Doc 1754.
U.S. Appl. No. 17/372,493 / Notice of Publication dated Jan. 13, 2022, 1 page, Doc 1755.
PCT/US2021/041205 / PCT Application filed Jul. 11, 2021, 93 pages, Doc 1756.
PCT/US2021/041205 / Invitation to Correct Defects dated Jul. 28, 2021, 2 pages, Doc 1757.
PCT/US2021/041205 / Response to Invitation to Correct Defects filed Sep. 14, 2021, 4 pages, Doc 1758.
PCT/US2021/041205 / International Search Report and Written Opinion dated Oct. 20, 2021, 9 pages, Doc 1759.
PCT/US2021/041205 / Article 34 Amendment and Chapter II Demand filed May 5, 2022, 18 pages, Doc 1761.
PCT/US2021/056699 / PCT Application filed Oct. 26, 2021, 72 pages, Doc 1766.
PCT/US2021/056699 / Invitation to Correct Defects in the International Application dated Nov. 16, 2021, 2 pages, Doc 1767.
PCT/US2021/056699 / Response to Invitation to Correct Defects in the International Application filed Jan. 13, 2022, 2 pages, Doc 1768.
PCT/US2021/056699 / Intl Search Report and Written Opinion dated Jan. 28, 2022, 66 pages, Doc 1769.
U.S. Appl. No. 16/789,199 / Patent Application filed Feb. 12, 2020, 48 pages, Doc 1770.
U.S. Appl. No. 16/789,199 / Filing Receipt and Notice to File Corrected Application Papers dated Mar. 3, 2020, 6 pages, Doc 1771.
U.S. Appl. No. 16/789,199 / Respose to Notice to File Corrected Application Papers dated Mar. 23, 2020, 11 pages, Doc 1772.
U.S. Appl. No. 16/789,199 / Updated Filing Receipt dated Mar. 26, 2020, 4 pages, Doc 1773.
U.S. Appl. No. 16/789,199 / Notice of Publication dated Aug. 14, 2020, 1 page, Doc 1774.
U.S. Appl. No. 16/789,199 / Non-final Office Action dated May 12, 2021, 18 pages, Doc 1775.
U.S. Appl. No. 16/789,199 / Amendment filed Aug. 12, 2021, 14 pages, Doc 1776.
U.S. Appl. No. 16/789,199 / Notice of Allowance / Allowability dated Sep. 1, 2021, 10 pages, Doc 1777.
U.S. Appl. No. 16/789,199 / Issue Fee Payment and Comments on Reasons for Allowance filed Dec. 1, 2021, 12 pages, Doc 1778.
U.S. Appl. No. 16/789,199 / 312 Amendment filed Dec. 1, 2021, 9 pages, Doc 1779.
U.S. Appl. No. 16/789,199 / Corrected Notice of Allowability and Examiner Response to 312 Amendment dated Dec. 14, 2021, 4 pages, Doc 1780.
U.S. Appl. No. 16/789,199 / Issue Notification dated Dec. 21, 2021, 1 page, Doc 1781.
U.S. Appl. No. 17/539,810 / Patent Application filed Dec. 1, 2021, 67 pages, Doc 1782.
U.S. Appl. No. 17/539,810 / Filing Receipt and Notice to File Corrected Application Papers dated Dec. 14, 2021, 6 pages, Doc 1783.
U.S. Appl. No. 17/539,810 / Response to Notice to File Corrected Application Papers filed Jan. 28, 2022, 9 pages, Doc 1784.
U.S. Appl. No. 17/539,810 / Response to Notice of Incomplete Reply filed Feb. 3, 2022, 11 pages, Doc 1785.
U.S. Appl. No. 17/539,810 / Updated Filing Receipt dated Feb. 8, 2022, 4 pages, Doc 1786.
U.S. Appl. No. 17/539,810 / Notice of Publication dated May 19, 2022, 1 page, Doc 1787.
PCT/US2020/017966 / PCT Application filed Feb. 12, 2020, 51 pages, Doc 1789.
PCT/US2020/017966 / International Search Report and Written Opinion dated Jun. 25, 2020, 18 pages, Doc 1790.
PCT/US2020/017966 / Article 34 Amendment and Chapter II Demand filed Oct. 23, 2020, 20 pages, Doc 1791.
PCT/US2020/017966 / International Preliminary Report on Patentability dated Feb. 17, 2021, 20 pages, Doc 1792.
CA3,130,202 / CA National Phase Application filed Aug. 12, 2021, 41 pages, Doc 1801.
U.S. Appl. No. 17/109,038 / Patent Application filed Dec. 1, 2020, 54 pages, Doc 1793.
U.S. Appl. No. 17/109,038 / Filing Receipt dated Dec. 11, 2020, pages, Doc 1794.
U.S. Appl. No. 17/109,038 / Non-final Office Action dated Feb. 16, 2022, 19 pages, Doc 1795.
U.S. Appl. No. 17/109,038 / Amendment filed May 6, 2022, 15 pages, Doc 1796.
U.S. Appl. No. 17/109,038 / Notice of Publication dated Jun. 2, 2022, 1 page, Doc 1797.
PCT/US2020/062755 / PCT Application filed Dec. 1, 2020: PCT Application filed Dec. 1, 2020, 55 pages, Doc 1798.
PCT/US2020/062755 / PCT Application filed Dec. 1, 2020: International Search Report and Written Opinion dated Feb. 19, 2021, 12 pages, Doc 1799.

(56) References Cited

OTHER PUBLICATIONS

U.S. Appl. No. 17/690,935 / Patent Application filed Mar. 9, 2022, 65 pages, Doc 1800.
U.S. Appl. No. 17/690,935 / Filing Receipt dated Mar. 14, 2022, 3 pages, Doc 1802.
U.S. Appl. No. 17/109,038 / Notice of Allowance / Allowability dated Jun. 15, 2022, 17 pages, Doc 1841.
U.S. Appl. No. 17/372,493 / Non-final Office Action dated Nov. 18, 2022, 20 pages, Doc 1861.
U.S. Appl. No. 17/081,685 / Response to Final Office Action & AFCPR dated Nov. 23, 2022, 21 pages, Doc 1862.
U.S. Appl. No. 17/539,810 / Non-final Office Action dated Sep. 28, 2022, 16 pages, Doc 1853.
U.S. Appl. No. 17/109,038 / Issue Fee Payment and Response filed Sep. 12, 2022, 9 pages, Doc 1859.
U.S. Appl. No. 17/109,038 / Issue Notification, dated Oct. 5, 2022, 1 page, Doc 1860.
U.S. Appl. No. 17/539,810 / Terminal Disclaimer and Response to Non-Final Office Action filed Dec. 28, 2022, 18 pages, Doc 1873.
U.S. Appl. No. 17/539,810 / Notice of Allowance and Allowability dated Jan. 25, 2023, 13 pages, Doc 1883.
U.S. Appl. No. 17/372,493 / AFCP Request & Response to Final Office Action filed May 30, 2023, 26 pages, Doc 1919.
U.S. Appl. No. 17/372,493 / Advisory Action dated Jun. 9, 2023, 4 pages, Doc 1920.
U.S. Appl. No. 17/372,493 / RCE & Amendment filed Jun. 29, 2023, 31 pages, Doc 1921.
U.S. Appl. No. 17/372,493 / Non-Final Office Action dated Jul. 12, 2023, 13 pages, Doc 1922.
BR Application No. 1120230080452 / Brazil Application filed Apr. 27, 2023, 38 pages, Doc 1924.
CA Application No. 3,196.741 / Canada Application filed Apr. 26, 2023, 17 pages, Doc 1925.
EP Application No. 21887366.9 / European Application filed Apr. 27, 2023, 6 pages, Doc 1926.
EP Application No. 21887366.9 / Rule 161-162 Communication received dated Jun. 6, 2023, 3 pages, Doc 1927.
EP Application No. 21887366.9 / Notice of Publication dated Aug. 9, 2023, 1 page, Doc 1928.
IN Application No. 202347030304 / India Application filed Apr. 27, 2023, 68 pages, Doc 1929.
IN Application No. 202347030304 / Application Filing Receipt dated Apr. 27, 2023, 1 page, Doc 1930.
IN Application No. 202347030304 / Publication Notice dated Jun. 28, 2023, 2 pages, Doc 1931.
U.S. Appl. No. 17/539,810 / Issue Notification dated May 17, 2023, 2 pages, Doc 1932.
PCT/US2023/014842 / International Search Report and Written Opinion dated Jul. 7, 2023, 12 pages, Doc 1933.
U.S. Appl. No. 17/372,493 / Response to Non-Final Office Action filed Feb. 21, 2023, 18 pages, Doc 1896.
U.S. Appl. No. 17/372,493 / Final Office Action dated Mar. 29, 2023, 22 pages, Doc 1895.
U.S. Appl. No. 17/539,810 / Corrected Notice of Allowability dated Feb. 15, 2023, 6 pages, Doc 1898.
U.S. Appl. No. 17/539,810 / Issue Fee Payment and Comments on Reasons for Allowance filed Apr. 24, 2023, 9 pages, Doc 1900.
PCT/US2023/014842 / PCT Application filed Mar. 9, 2023, 66 pages, Doc 1899.

\* cited by examiner

TRANSACTION AUTHENTICATION, AUTHORIZATION, AND/OR AUDITING UTILIZING SUBSCRIBER-SPECIFIC BEHAVIORS

BACKGROUND

1. Field

The present disclosure relates generally to approaches toward electronic transaction verification and, more particularly, to electronic communication infrastructures that facilitate estimating trustworthiness and/or verifying the identity of a party attempting to engage in a transaction.

2. Information

The World Wide Web or simply the Web, as provided by the Internet, has grown rapidly in recent years at least partially in response to the relative ease by which a wide variety of types of transactions can be performed or enabled via the Internet. In an environment in which electronic- and/or Internet-based commerce takes place on a grand scale, occurrences of fraud and deception can, unfortunately, frequently occur. To reduce the instances of fraud and deception, various fraud-protection processes and/or procedures have been developed and utilized. Such procedures are employed, for example, in connection with everyday online or electronic transactions, which may include financial transactions, establishment of lines of credit, in-store purchases for goods and/or services, or the like.

In an environment in which various electronic devices typically used for communications, such as smart phones, tablet computing devices, laptop computers, etc., have become ubiquitous, techniques for accomplishing fraud have become more sophisticated, such as perhaps involving use and/or knowledge of complex technology, for example, related to the particular hardware and/or software platforms associated with such smart phones, tablets, laptop computers, etc. Thus, attempts to reduce the instances of fraud and deception, which may involve, for example, use of various electronic devices, continues to be an active area of investigation.

SUMMARY

One general aspect concerns a method that includes receiving, at a server coupled to a communications network, a first signal indicating that a subscriber of a mobile device has initiated a transaction. The method also includes accessing a data store to determine occurrence of one or more deterministic events with respect to the mobile device. The method also includes accessing the data store to determine one or more behavior norms specific to the subscriber with respect to the mobile device. The method also includes generating, by the server coupled to the communications network, a second signal indicating an authorization status of the transaction, the authorization status being dependent, at least in part, on the occurrence of the one or more deterministic events in relation to the one or more behavior norms.

Particular embodiments of the method may include additional features, such as computing a first trust measure responsive to determining the occurrence of the one or more deterministic events. Particular embodiments of the method may also include computing no less than a second trust measure responsive to determining the one or more behavior norms specific to the subscriber. Particular embodiments of the method may also include determining the authorization status of the transaction based, at least in part, on the first trust measure and the second trust measure. Particular embodiments of the method may also include combining the first trust measure with at least the second trust measure to bring about a combined trust measure that is greater than the first trust measure. Particular embodiments of the method may also include combining the first trust measure with at least the second trust measure that brings about a combined trust measure that is less than or equal to the first trust measure. In particular embodiments of the method, at least the first one of the one or more deterministic events is weighted differently than at least a second one of the one or more deterministic events. In particular embodiments, a deterministic event of the one or more deterministic events corresponds to a standalone historical event or a real-time event. In particular embodiments, the one or more deterministic events correspond to at least one of the following: a velocity-type measure of one or more historical events; a tenure-type measurement of one or more historical events, a real-time event measure, or any combination thereof. In particular embodiments, one or more deterministic events correspond to one or more of the subscriber's off-line activities unrelated to the transaction. In particular embodiments, the one or more deterministic events may comprise, but is not limited to, for example: reading, via a device affiliated with the subscriber, a machine-readable code; accessing content from a device external to the device affiliated with the subscriber; communicating with a wireless access point affiliated with the subscriber, or any combination thereof. In particular embodiments, one or more deterministic events corresponds to the subscriber initiating an application for credit at a geographical location that is widely separated from the subscriber's home. In particular embodiments, the one or more behavioral norms specific to the subscriber with respect to the mobile device are at least partially derived from a historical record of the occurrence of the one or more deterministic events performed by the subscriber with respect to the mobile device.

Another general aspect includes a server, including at least one processor communicatively coupled to at least one memory to initiate reception, from a communications network, of at least a first signal to indicate that a subscriber of a mobile device has initiated a transaction. The at least one processor may also access a data store to determine occurrence of one or more deterministic events with respect to the mobile device. The at least one processor may also access the data store to determine one or more behavior norms specific to the subscriber with respect to the mobile device. The at least one processor may also initiate the generation of a second signal to indicate an authorization status of the transaction, the authorization status to be dependent on the occurrence of the one or more deterministic events in relation to the one or more behavior norms. Other embodiments of this aspect include corresponding computer systems, apparatus, and computer programs recorded on one or more computer storage devices, each configured to perform the actions of the methods.

In particular embodiments, the at least one processor communicatively coupled to the at least one memory is additionally to: compute at least one first trust measure responsive to determining the occurrence of the one or more deterministic events. In particular embodiments, the server may also compute at least one second trust measure responsive to determining the one or more behavior norms specific to the subscriber. The server may also combine the at least one first trust measure with the at least one second trust measure to form the authorization status of the transaction. The server may also combine at least one first trust measure with the at least one second trust measure to form at least one combined trust measure that is greater than the at least one first trust measure. The server may also combine at least one first trust measure with the at least one second trust measure to form at least one combined trust measure that is less than or equal to the at least one first trust measure. The combination of the first one of the one or more deterministic events can be weighted more heavily than at least a second one of the one or more deterministic events. In particular embodiments, the data store, accessed by the at least one processor may be communicatively coupled to the at least one memory, includes: a first database to store records relevant to the one or more deterministic events with respect to the mobile device. The server may also include at least a second database to store records relevant to the one or more behavior norms specific to the subscriber with respect to the mobile device. A deterministic event of the one or more deterministic events may correspond to a standalone deterministic event. One or more deterministic events may correspond to a velocity-type measure of one or more historical events; a tenure-type measure of one or more historical events; a real-time event-type measure; or any combination thereof. One or more deterministic events may comprise at least one of the following: reading, via a device affiliated with the subscriber, a machine-readable code; accessing content from a device external to the device affiliated with the subscriber; and communicating with a wireless access point affiliated with the subscriber. The one or more deterministic events may correspond to the subscriber initiating an application for credit at a geographical location widely separated from the subscriber's home. Thus, one or more deterministic events may correspond to one or more of the subscriber's off-line activities that may or may not be related to a particular transaction at issue.

One general aspect includes an article including a non-transitory storage medium having instructions stored thereon executable by a special-purpose computing platform to obtain a first signal to indicate that a subscriber of a mobile device has initiated a transaction. The instructions included on the non-transitory storage medium may also include instructions to access a data store to determine occurrence of one or more deterministic events with respect to the mobile device and to determine one or more behavior norms specific to the subscriber with respect to the mobile device. The instructions included on the non-transitory storage medium may also include instructions to compute, based, at least in part, on the determined occurrence of the one or more deterministic events in relation to the determined one or more behavior norms specific to the subscriber with respect to the mobile device, an authorization status. The instructions included on the non-transitory storage medium may also include instructions to generate a second signal based, at least in part, on the computed authorization status.

In particular embodiments, the executable instructions are additionally to compute one or more first trust measures responsive to determining the occurrence of the one or more deterministic events. The executable instructions may additionally be to compute one or more second trust measures responsive to determining the one or more behavior norms specific to the subscriber. The executable instructions may additionally be to combine the one or more first trust measures with the one or more second trust measures to form the computed authorization status of the transaction. The executable instructions may additionally be to combine the first trust measure with the second trust measure to bring about a combined trust measure that is greater than the first trust measure. The executable instructions may additionally be to combine the first trust measure with the second trust measure to bring about a combined trust measure that is less than or equal to the first trust measure. The executable instructions may additionally be to assign a first weight value to a first one of the one or more deterministic events; and to assign a second weight value to a second one of the one or more deterministic events, the first weight value being different from the second weight value. The deterministic events may comprise at least one of the following: porting of a telephone number within a first period of time; replacing a subscriber identity module (SIM) within a second period of time; obtaining a mobile device, previously unused by the subscriber, within a third period of time; and the subscriber resetting a password within a fourth period of time. The one or more behavior norms may comprise at least one of the following: the subscriber's history of porting a telephone number within a first period of time; the subscriber's history of replacing a SIM within a second period of time, the subscriber's history of obtaining a mobile device, previously unused by the subscriber, within a third period of time; the subscriber's history of resetting a password within a fourth period of time, or any combination thereof. The one or more deterministic events may correspond to one or more of the subscriber's off-line activities that may be unrelated to a transaction.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

Figure 1:
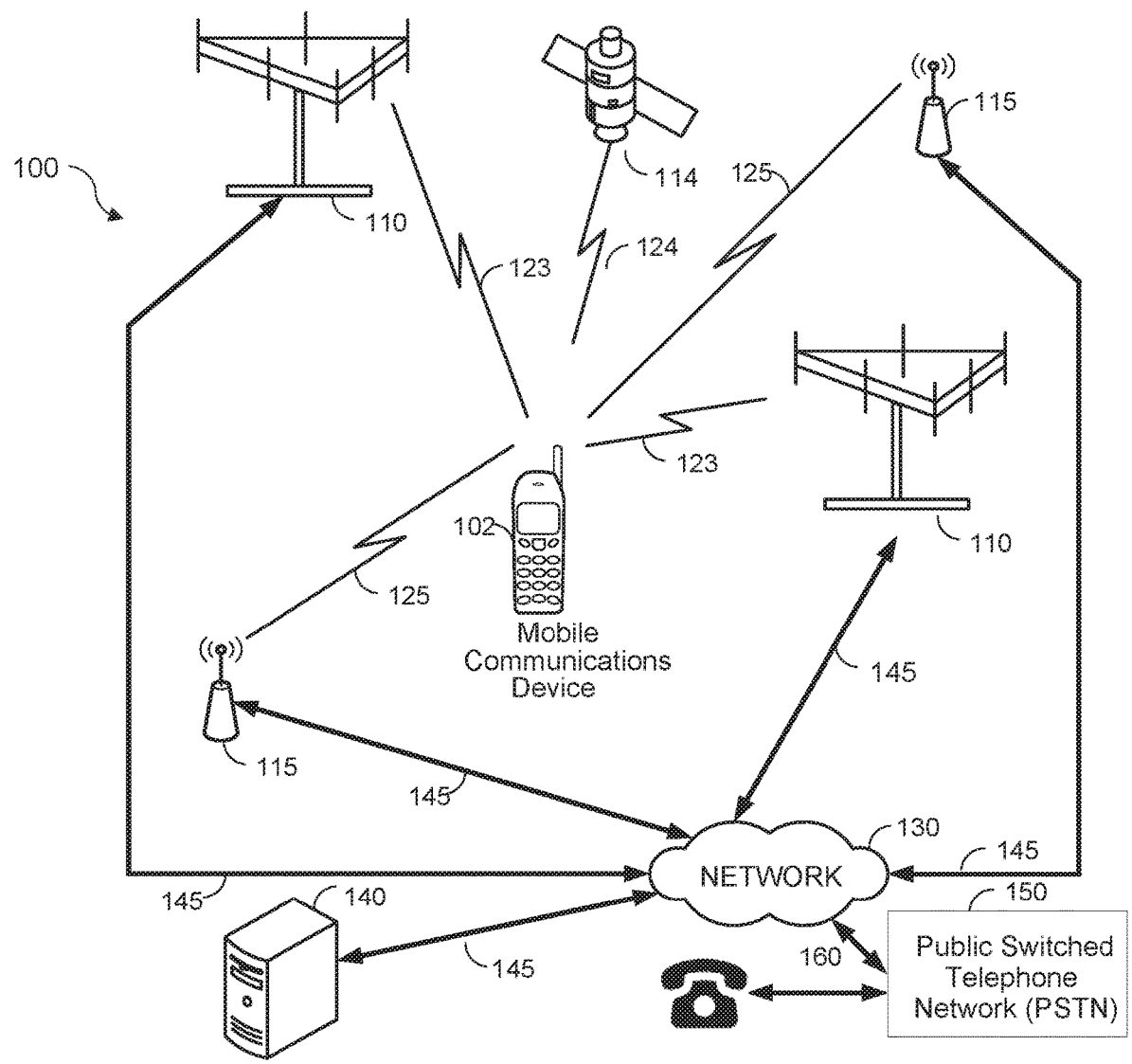
FIG. 1 is a diagram of a telecommunications infrastructure, according to various embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application. As discussed herein, auditing, authorizing, and/or authentication represent possible approaches, among many possible approaches, to reduce the risk of fraud. Other approaches or portions thereof, such as identity verification, authorization, auditing, and/or authorizing, or the like may also be used herein, in whole or in part, such as part of, in addition to, and/or in conjunction with auditing, authorizing, and/or authenticating a transacting party as such may be employed to prevent, or to at least reduce the incidence of, allowing fraudulent transactions to take place.

In an environment in which electronic communication devices, such as landline or wireline telephones, voice over Internet protocol (VoIP) communications devices, etc., have become ubiquitous, a communications device user may wish to engage in a transaction (e.g., a financial transaction, a stock swap, etc.) utilizing such electronic communications devices. Prior to initiating an electronic transaction, a user of an electronic communications device may establish an identity, such as may be established in connection with an electronic communications device subscriber account with a cellular communications device services carrier, a VoIP services provider, or other telecommunications carrier. Establishment of an electronic communications device subscriber account may permit the identity of an individual attempting to engage in an electronic transaction to be verified, audited, authorized, and/or authenticated. In some instances, given the nature of transactions, such as in an environment in which electronic transactions take place via a communications network at any time and at any location, it may be useful to be able to perform verifying, auditing, authorizing, and/or authenticating operations relatively quickly, such as in a real-time fashion or with reduced delay.

As a general matter, auditing, authorizing, and/or authenticating of a transacting party, such as mobile authentication, may be desirable in response to an institution or organization (e.g., third party, etc.) wishing to verify or audit, authorize, and/or authenticate the identity of a transacting party (e.g., a mobile subscriber). Auditing, authorizing, and/or authenticating may involve establishing a correspondence and/or association of a transacting party with a persistent mobile communications device identifier, as demonstrated below through illustrative examples. In this context, a correspondence, association, and/or similar terms refer to a persistent, continuing and objectively verifiable relationship between a transacting party within a particular mobile communications device. Thus, a mobile communications device identifier may be employed to signify and/or identify a particular transacting party. The term "mobile communications device identity" and/or similar terms in this context refer to an identity that relies on a mobile communications device account relationship (also referred to as a correspondence and/or association) of a user as a source of auditing, authorizing and/or authenticating a transacting party and is capable of being verified by another (e.g., a third-party auditing, authorizing and/or authenticating entity). The term "mobile communications device account" and/or similar terms in this context refer to a mobile services provider account. Likewise, the terms "mobile communications device services provider," "mobile communications device carrier," "mobile network operator" may be used interchangeably. Furthermore, in this context, the term "mobile device services carrier," "telecommunications services carrier," or simply "carrier" may refer to an entity of a telecommunications infrastructure that provides wired and/or wireless communication services to the general public for a consideration, such as a fee.

Thus, while a carrier (e.g., a telecommunications services carrier) may comprise a mobile communications device services provider and/or mobile network operator. However, there are examples of carriers that may not correspond to mobile communications device services providers and/or mobile network operators. Such instances may include wireline services providers (for example, the public switched telephone network or PSTN) providing services for rotary dial telephones and/or telephones utilizing, for example, dual tone multi-frequency (DTMF) signaling. Accordingly, the term "carrier" may be used in place of mobile communications device services provider and/or wireline telephone services provider without a loss in meaning and/or understanding. In a given situation, particular context of usage should indicate if carrier is being used in its most general sense or in a narrow sense, such as referring to a mobile communications device services provider, wireline services provider, and/or mobile network operator, for example.

It is noted that while a correspondence or association between a transacting party and a mobile communications device need not be long-term, such correspondence or association between a transacting party and a mobile communications device should imply some amount of persistence to be of use in this context. Other aspects of auditing, authorizing, and/or authentication are described in greater detail later. As noted, in an embodiment, auditing, authorizing, and authenticating a transacting party, may relate to a mobile account and/or a mobile subscriber, for example. As mentioned, a mobile account is one example of a type of account, especially in a networked electronic commerce environment, although claimed subject matter is not intended to be limited to online accounts or mobile accounts. Rather, the term "account" in this context refers to a formal business arrangement between an entity, person, or other type of transacting party, and a provider of the account in order to accomplish a business purpose, for example. It is noted, for purposes of clarification, that in some situations, a person may represent an entity. The term "account" is intended to be broadly interpreted and may include a service account, a financial account, an account relating to access to content, as just a few illustrative examples. Thus, continuing with non-limiting examples, an account, in various embodiments, may, for example, be employed with respect to purchase of goods and/or services, access to content, access to financial accounts, access to medical records, access to corporate or organizational intellectual property and/or other types of records and/or files, etc.

Likewise, an account may comprise attributes associated with or corresponding to the account. In this context, the term "attribute" may refer to a specific quality or feature associated with the account that at least in part defines aspects of the account. Examples, again, as non-limiting illustrations, may include: an account number, an owner of the account and/or other attributes that potentially may differ based at least in part on the type of account. For example, as non-limiting illustrations, with respect to a mobile communications device account, examples of attributes may include: (1) an identifier of a mobile subscriber account with a mobile communications device services provider, (2) a mobile subscriber unique alias, (3) a mobile telephone number, (4) a mobile subscriber service provider; and/or (5) an international mobile subscriber identifier (IMSI), Integrated Circuit Card Identifier (ICC ID) and/or other type of identifier employed in connection with the particular mobile network operator or the mobile communications device services provider, such as a network providing services compatible or compliant with a Global System for Mobile Communications (GSM) telecommunications network. Other examples of attributes may comprise an international mobile equipment identifier (IMEI), a mobile equipment identifier and/or other identifiers in addition, such as a mobile subscriber account number/identifier and/or billing account number/identifier. Furthermore, again, providing additional non-limiting illustrations, a database may include other attributes, such as past transaction related attribute records, including, as non-limiting examples, merchants and/or other third party requesters, dates, description of transactions completed, and/or also may include change events, such as associated with one or more of the following, for example: (1) mobile communications device services provider, (2) IMSI (or other subscriber ID), (3) IMEI (or device equivalent), (4) mobile number, and/or (5) network status. It is worth noting, as mentioned, the term attribute used with respect to an account should be read broadly in this context (e.g., in comparison with attributes of a mobile account for use in identity verification).

Some example methods, apparatuses, and/or articles of manufacture are disclosed herein that may be used, in whole or in part, to facilitate and/or support one or more operations and/or techniques for Trust Portal electronic infrastructure, such as implemented in connection with a processor-equipped cellular mobile communications device (which may be referred to herein as a "mobile communications device") communicating with one or more computing devices via the one or more communication networks utilizing one or more communications protocols (e.g., network protocols, etc.) discussed herein. The mobile communications device may be utilized to authorize a transacting party, and/or authenticate a transacting party, so as to permit a particular electronic or on-line transaction to take place. Such electronic or on-line transactions, which may herein be referred to as simply "transactions," may involve transactions related to one or more financial accounts, such as accounts that relate to a line of credit, a mobile communication device services account, a bank account, a brokerage account, and so forth. In this context, a "transacting party" refers to an entity, such as an individual subscriber, who may attempt to engage in and/or facilitate an electronic or on-line transaction.

Also in this context, the term "deterministic event" refers to a behavioral-, ownership-, and/or possession-related aspect of a mobile communications device and/or a transacting party corresponding or associated with the mobile communications device, such as via an identity (e.g., a mobile identity, etc.), which may be recorded and/or tracked utilizing a database for auditing, authorizing, and authenticating a transacting party, such as without a change to that identity (e.g., an identity stays the same despite these change events, etc.). It is noted that the foregoing provides a non-exhaustive list of illustrations of possible deterministic events. Furthermore, as the nature of mobile communications evolves, it is likewise possible that events that would qualify as deterministic events may come into practice in connection with mobile accounts that currently may not be occurring, for example.

As will be seen, in some instances, one or more operations and/or techniques utilized in systems and methods for caller verification may be implemented to determine the occurrence of one or more deterministic events with respect to, or within the context of, operation of a mobile communications device owned, or at least associated with and/or in the possession of, a transacting party. Such deterministic events may include, but are not limited to, porting of a telephone number between a first mobile communications device carrier to a second mobile communications device carrier, replacing a subscriber identity module (SIM) of a mobile communications device, purchasing (or otherwise obtaining) a new, previously unused mobile communications device, and changing or updating a password. Occurrence of certain deterministic events within an electronic infrastructure may be considered in selecting, such as by way of a computing device, whether an electronic or on-line transaction should be permitted to occur.

In particular embodiments, deterministic events refer to standalone historical events, such as a single porting event with respect to a subscriber's telephone number. In other examples, standalone historical events may refer to a removal/replacement of a subscriber's mobile communications device SIM, replacement of a subscriber's mobile communications actual device, resetting or obtaining a one-time password, or the standalone occurrence of any other online or off-line deterministic event that may be unrelated to a transaction. In certain embodiments, occurrence of deterministic events may refer to the "velocity" of a historical event, which may represent a rate or a frequency of occurrence of an online or off-line deterministic event with respect to time. For example, a subscriber's phone number-porting events may occur with a velocity of one event per one-year period. In other examples, deterministic events having a velocity aspect may refer to the rate (perhaps in occurrences per year) that a subscriber removes/replaces a SIM, replaces a mobile communications device, resets or obtains a password, or may relate to any other online or off-line deterministic event.

In particular embodiments, deterministic events may refer to real-time events, such as events occurring within a few seconds, a few minutes, a few hours (or other relatively short period of time) of the time that a mobile communications device user attempts to engage in a transaction. For example, a record of the user's porting of a telephone number from a first carrier to a second carrier may not be instantaneously readable from a permanent or semi-permanent record in a carrier database. In some instances, such records may be updated in a carrier database at a particular time during the day, such as between midnight and 6:00 AM local time, for example. Accordingly, a financial institution attempting to authenticate, authorize, and/or audit a transaction, perhaps during normal business hours, may perform a real-time action to determine if a mobile communications device user has very recently ported his or her telephone number. Real-time events may include other processes and subprocesses conducted, for example, during an interaction between mobile communications device user and an institution, and claimed subject matter is not limited in this respect.

Within the context of electronic or on-line transactions, behaviors of an individual subscriber, as such behaviors relate to the subscriber's mobile communications device, for example, may be considered in a decision to approve, or to deny, a transaction. Behaviors exhibited by an individual mobile communications device subscriber may be referred to as "subscriber-specific" behaviors, for example. As will be described further herein, occurrence of one or more deterministic events, within the context of a subscriber's mobile communications device, may be considered within the additional context of one or more subscriber-specific behaviors. For example, as will be described herein, an occurrence of a deterministic event, such as porting of a mobile telephone number of a mobile communications device from a first mobile communications device carrier to a second mobile communications device carrier, may be considered within the context of an individual subscriber's tendency or history of porting a cellular telephone number between or among different carriers. In another example, an occurrence of a deterministic event related to a subscriber's replacing an identity module, such as a subscriber identity module or "SIM," of his or her mobile communications device may be considered within the context of the individual subscriber's tendency or history, for example, to replace a SIM of his or her mobile communications device. In another example, a subscriber's recent replacement of a mobile communications device (such as with a new or previously unused mobile communications device) may be considered within the context of the individual subscriber's tendency or history to periodically and/or regularly obtain the latest and most modern mobile communications device. In another example, a subscriber's recent resetting of a password, such as a password utilized to obtain access to an online bank account, may be considered within the context of the individual subscriber's tendency or history to reset passwords utilized to obtain online services.

Other types of deterministic events may be considered within the context of an individual's tendency or history to perform, or to at least initiate, such deterministic events, and claimed subject matter is not limited in this respect. For example, in particular embodiments, a deterministic event refers to an activity or an interaction (e.g., a routine activity or interaction), utilizing a subscriber's mobile communications device, with a touchpoint of a communications infrastructure via an Internet browser, a text messaging application, Bluetooth (BT) or any other relatively short-distance communications application, or other type of interface. For example, a deterministic event may correspond to a subscriber utilizing a mobile communications device to browse Internet websites, read articles, view content, etc. In another example, a deterministic event may correspond to a subscriber interacting with a machine-readable printed graphic (e.g., a QR code, barcode, etc.), which may bring about downloading of particular content from an Internet website. In another example, a deterministic event may correspond to a subscriber performing a check-in operation, such as at an airport or at any other geographical location. Such deterministic events involving touchpoints of a communications infrastructure may result in the generation of a record (e.g., a digital record) of the subscriber's possession and/or use of a mobile communications device.

Consequently, in particular embodiments, although a deterministic event may, for example, either negatively or positively impact a subscriber's trustworthiness, the subscriber's trustworthiness may be enhanced (e.g., positively impacted) responsive to determining that such deterministic events represent relatively normal occurrences for the subscriber. Accordingly, in particular embodiments, certain types of transactions, if conducted within typical or conventional electronic communication infrastructures, might have been denied or disapproved in response to the determination of the occurrence of one or more deterministic events, may be permitted to occur in view of, or in relation to, a subscriber's history or tendency to take part in (or to perform) such deterministic events. Such enhancing of a subscriber's trustworthiness may bring about an ability to approve particular types of transactions which may otherwise be disapproved, thereby reducing unnecessary denials, disapprovals, or delays of such transactions. Thus, in an embodiment, even if a mobile communications device subscriber has recently, for example, ported a device's telephone number between first and second carriers, such number-porting may not result in denial of a transaction when viewed in the context of the subscriber's history or tendency of porting a telephone numbers among carriers. Particular embodiments are intended to embrace additional deterministic events with respect to a subscriber's mobile communications device, when viewed within the context of behavior norms, behavior history, and/or behavior tendencies of the subscriber (e.g., the specific subscriber), and claimed subject matter is not limited in this respect.

In addition to utilizing an electronic communications device subscriber account, a subscriber's affiliated devices may also be utilized in an approach toward verifying, auditing, authorizing, and/or authenticating a subscriber. For example, a mobile communications device subscriber may own, possess, or at least make use of, a host of other devices, such as a tablet, laptop, or desktop computing device, an interactive television device capable of executing application programs and/or displaying streamed video, a voice-activated entertainment/control device, gaming devices, etc. Such devices, especially when coupled to a subscriber's home wireless fidelity (Wi-Fi) network, for example, may operate in concert with deterministic events related to the subscriber's mobile communications device to verify, audit, authorize, and/or authenticate the subscriber's identity. In some instances, in addition to, or in place of, such devices being coupled to a subscriber's home Wi-Fi network, use of such devices within a limited geographical area, such as within a subscriber's neighborhood, city or town, apartment or condominium complex, for example, may be utilized to complement other approaches towards verifying, auditing, authorizing, and/or authenticating a subscriber.

As is also discussed below, one or more operations and/or techniques for implementing transaction authentication utilizing subscriber-specific behaviors may allow a particular institution or organization, such as a bank, a retailer, a broker, an automobile dealer, just to illustrate possible examples, to authenticate a mobile subscriber so that a transaction may be permitted to take place. Depending on an implementation, subscriber-specific behaviors may be utilized, in combination with deterministic events, to permit a more accurate approach toward authentication of an individual requesting approval of a transaction. Accordingly, transactions that may otherwise be denied or disapproved may be approved in view of increased accuracy with respect to authenticating an individual. Conversely, for example, under certain circumstances, transactions that may otherwise be approved may be denied in view of increased accuracy with respect to an individual's attempt to fraudulently engage in a transaction.

Although the discussion that follows relates to any type of account, as a non-limiting illustration, mobile accounts may be used for illustration. However, it is understood, of course, that claimed subject matter is intended to not be limited to examples provided primarily for purposes of illustration, since such examples may be oversimplified for purposes of comprehension, for example. As mentioned previously, with respect to commerce, including, of course, mobile accounts, a risk of fraud and/or unauthorized actions taking place is present.

The following provides a few illustrative examples of accounts in which a risk of fraud and/or unauthorized actions may exist. A calling party (e.g., a call source) may attempt to access a bank account via a web browser or an executable application on a mobile communications device, for example. Thus, a bank, lender, brokerage firm, or any other type of financial institution, in response to the attempt to access the bank account, may employ an application programming interface (API) substantially compatible and/or substantially compliant with HTTP and/or HTTPS, including versions now known and/or to be later developed, and/or another suitable protocol (e.g., now known and/or to later be developed). In the foregoing example, a user may seek to take one or more actions with respect to an account, such as, for example, establishing an account, transferring funds, viewing a history of transactions, updating personal content, etc.

Thus, as suggested, a user (e.g. a caller at a call source) may seek to access, for example, an online account. A third party, such as those who may provide such an account, may seek to protect access appropriately at least in part for reasons of confidentiality. In an example, a software company and/or product, such as a developer of tax-preparation software products, may have a user account established. One may also consider similar variations in which confidentiality may not be an aspect. For example, for premium content management, a user may seek to access content because he or she has an online subscription to a major newspaper. In another instance, a user may desire to access content, whether such content corresponds to personalized content (e.g., of a social media network) or does not correspond to personalized content, such as premium sports-related content. In another instance, a user may be returning to a website and/or application, and accessing the website or application could be dependent at least in part on binding a user with a website and/or with an application, such as via an account for the user. In another example, a user may 'click' a 'click-to-call' button of a website and/or application to reach customer care. Thus, a third party may comprise a customer care facility of an enterprise, for example, such as a care facility of a bank, in which an account is established. Yet another scenario may involve confidentiality associated with medical records of patients, such as compliance with HIPAA, the Affordable Care Act, Electronic Medical Records, and/or other regulatory schemes. A variety of potential situations may arise in which a user may seek access to records, such as a patient, a company, such as for insurance, a hospital, a medical professional providing care, etc. Thus, again, a user or authorized agent may log into a user's medical record account that may exist online and/or be stored electronically, such as on a website. As yet another example, a variety of corporate programs, including as examples, airline mileage accounts, gift cards, etc., in which value has been accumulated, may be managed as online accounts. Thus, all of the foregoing examples and many more accounts are subject to risk associated with fraud and/or unauthorized actions by an unscrupulous individual.

Thus, in possible scenarios, an unscrupulous individual may desire to modify one or more attributes of a particular mobile account. For example, the unscrupulous individual may desire to create a false identity as the owner of the account. As mentioned previously, one way to handle such risks may be to employ verifying, auditing, authorizing, and/or authenticating, such as may pertain to an individual associated with a mobile communications device, which may include verifying trustworthiness of a transacting party, for example, via one or more appropriate processes and/or procedures. As also indicated, at times, such processes and/or procedures may include communicating (e.g., exchanging, etc.) content related to a particular user and/or entity (at a call source) utilizing one or more channels and/or other resources of a communications networks. For example, while transacting parties interact with an institution or organization, the transacting parties may provide certain content, including personally identifiable information that can be used, at least in part, to verify their identity. Included in this content are often uniquely identifiable values that uniquely identify a person, for example, such identifiers may include but are not limited to a phone number, a Social Security number, or the like. Additionally, such an identifier may be comprised of a group of values, for example, such identifiers may include but are not limited to an address, a first name, a date of birth, or the like.

In response to currently-available electronic communications systems being vulnerable to fraudulent activity, an electronic communications system capable of verifying, auditing, authorizing, and/or authenticating, such as with an increased degree of precision, the identity of a caller can provide a basis for a wide range of fraud-prevention capabilities involving communications networks. Fraud prevention activities may extend to reducing instances of identity theft, credit fraud, enabling parental controls, and so on. These results can be achieved, according to an embodiment disclosed herein, within a telecommunications infrastructure, such as shown in FIG. 1.

In FIG. 1 (embodiment 100) mobile communications device 102 operating at a call source may transmit radio signals to, and receive radio signals from, a wireless communications network. In an example, mobile communications device 102 may communicate with a cellular communications network by transmitting wireless signals to, and/or receiving wireless signals from, a cellular transceiver 110, which may comprise a wireless base transceiver subsystem (BTS), a Node B or an evolved NodeB (eNodeB), over wireless communication link 123. Similarly, mobile device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit mobile device 102 (or an affiliated device at a call source) to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 through communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between mobile device 102 at a call source and server 140 through local transceiver 115 or cellular transceiver 110. In an embodiment, network 130 may also facilitate communication between mobile device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with mobile device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to mobile device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between mobile device 102 and cellular transmitter 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in a signal using one or more of the above-identified modulation techniques.

In particular implementations, and as discussed below, mobile device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of mobile device 102 based on these location related measurements. In some implementations, location related measurements obtained by mobile device 102 may be transferred to a location server such as an enhanced serving mobile location center (E-SMLC) or SUPL location platform (SLP) (e.g. which may comprise a server, such as server 140) after which the location server may estimate or determine an estimated location for mobile device 102 based on the measurements. In the presently illustrated example, location related measurements obtained by mobile device 102 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Mobile device 102 or a separate location server may obtain a location estimate for mobile device 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 102. Here, server 140 may be capable of providing positioning assistance data to mobile device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, mobile device 102 may obtain measurements of signal strengths for signals received from cellular transceiver 110 and/or local transceiver 115 and/or may obtain a round trip signal propagation time (RTT) between mobile device 102 and a cellular transceiver 110 or local transceiver 115. A mobile device 102 may use these measurements together with assistance data (e.g. terrestrial almanac data or GNSS satellite data such as GNSS Almanac and/or GNSS Ephemeris information) received from server 140 to determine a location estimate for mobile device 102 or may transfer the measurements to server 140 to perform the same determination. A call from mobile device 102 may be routed, based on the location of mobile device 102, and connected to PSTN 150, for example, via wireless communication link 123 and communications link 160.

A mobile device at a call source (e.g., mobile device 102 of FIG. 1) may be referred to as a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

The architecture of the cellular communications network described in relation to FIG. 1 may be considered to comprise a generic architecture that capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
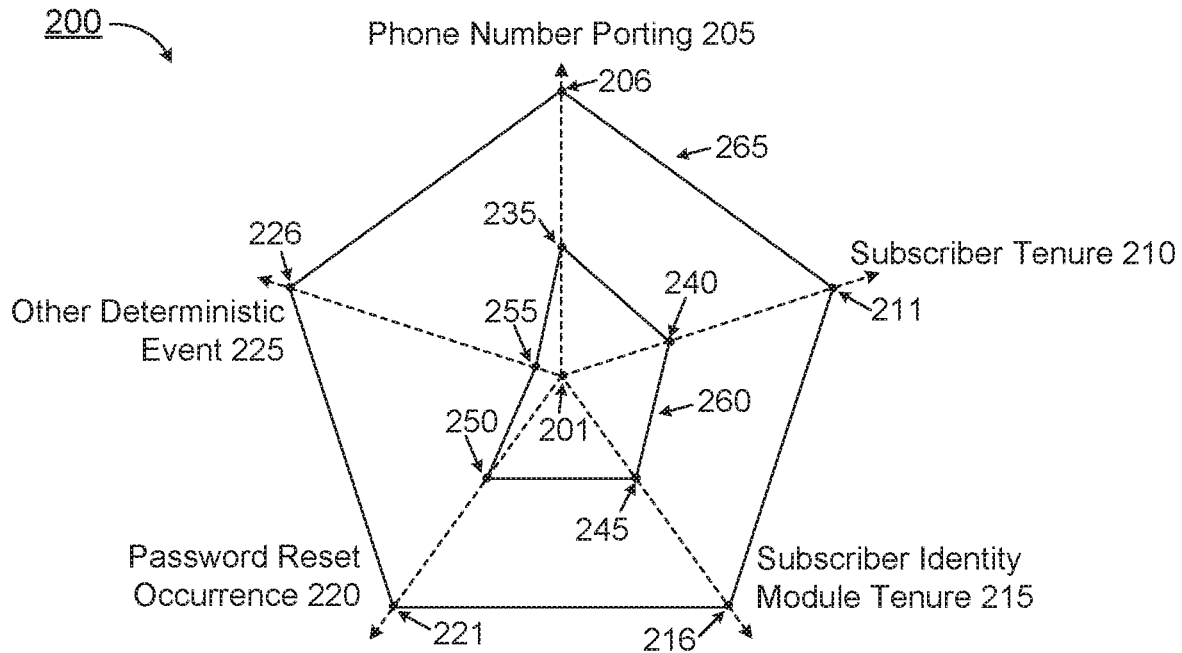
FIG. 2 shows a trust space and a first subscriber-specific trust contour, according to an embodiment.

In view of the communications infrastructure shown and described in reference to FIG. 1, more particular embodiments directed toward reducing the risk of fraud and deception involving a subscriber's mobile communications device are discussed herein below. Hence, FIG. 2 shows a trust space and a first subscriber-specific trust contour, according to an embodiment 200. The trust space of FIG. 2 may be constructed within a computer memory, such as a non-transitory computer memory in which physical states may be arranged in a memory array (e.g., a two-dimensional array). In such a memory array, the two-dimensional trust space of FIG. 2 may be represented as comprising a number of discrete axes, which may represent trust measures, for example. As previously discussed herein, such trust measures may correspond to measures of behavior, ownership, possession, and/or usage aspects of a mobile communications device, such as may be utilized by a subscriber attempting to engage in a transaction, such as a financial transaction. In this context, the term "trust measure" refers to a metric that relates to the capability to authenticate, authorize, and/or audit a party (e.g., a subscriber utilizing a mobile communications device) attempting to engage in an interaction, such as an interaction related to a financial transaction, an interaction related to accessing content from an Internet website, etc. In one embodiment, a first trust measure may be computed responsive to determining occurrence of one or more deterministic events of a trust space. It should be noted that although the trust space of FIG. 2 depicts a particular number of trust measures that correspond or relate to deterministic events with respect to a subscriber's behavior, ownership, and/or possession with respect to a mobile communications device, claimed subject matter is intended to embrace other types of measures that correspond to a smaller number of deterministic events (e.g., four or less) or to a larger number of deterministic events (e.g., six or more).

As depicted in FIG. 2, a first trust measure of phone number-porting may correspond to a velocity (e.g., a frequency) type measurement of a tendency of the subscriber to port his or her telephone number within a given period of time, such as from a first mobile telecommunications carrier to a second mobile telecommunications carrier. Thus, a subscriber who frequently ports the telephone number corresponding to his or her personal mobile device may be assigned a first trust measure of phone number-porting, which may comprise a relatively low value (e.g., closer to trust space origin 201) on phone number-porting axis 205 of a trust space. Conversely, a subscriber who tends to rarely or infrequently port a telephone number of his or her corresponding mobile device may be assigned a value different from the first trust measure of phone number-porting, which may comprise a relatively high value, on phone number-porting axis 205 of a trust space (e.g., further from trust space origin 201).

In the example of FIG. 2, historical norm 206 represents a point along phone number-porting axis 205 that is proportional to a subscriber-specific normal or historical measure (perhaps corresponding to a period greater than 10 years, for example) of phone number-porting. Accordingly, a subscriber who historically ports a telephone number corresponding to a personal mobile communications device on a relatively frequent basis may be assigned a historical norm, such as norm 206, which may be positioned at a considerable distance from trust space origin 201. Conversely, a subscriber who ports a telephone number corresponding to a personal mobile communications device on a relatively infrequent basis, for example, may be assigned a historical norm (206) positioned at a smaller distance from trust space origin 201.

The trust space of FIG. 2 also depicts a first trust measure of subscriber tenure as such tenure relates, for example, to a subscriber's possession, usage, and/or ownership of a particular mobile device. Thus, a subscriber who tends to own and/or operate the same mobile communications device for a relatively long duration, such as, for example, five or 10 years or more (e.g., infrequent replacement of a mobile communications device) may be assigned a first trust measure of subscriber tenure on subscriber tenure axis 210 that is relatively close to trust space origin 201. Conversely, a subscriber who tends to own and/or operate mobile devices for a lesser duration, such as one year or less (e.g., frequent replacement of a mobile communications device), may be assigned a first trust measure of subscriber tenure on subscriber tenure axis at a greater distance from trust space origin 201. In the example of FIG. 2, norm 211 represents a point along subscriber tenure axis 210 that is proportional to a subscriber-specific normal or historical measure of device tenure. In a manner similar to the positioning of norm 206, for a subscriber who tends to retain a mobile communications device for a long duration, for example, norm 211 may be located at a relatively small distance from trust space origin 201. Conversely, for subscriber who tends to retain a mobile communications device for a smaller duration, norm 211 may be located at a greater distance from trust space origin 201.

The trust space of FIG. 2 also depicts a first trust measure of SIM tenure of a mobile communications device. Thus, for example, a subscriber who tends to infrequently remove/replace a SIM may be assigned a trust measure on subscriber identity module tenure axis 215 that is located a short distance from trust space origin 201. Conversely, a subscriber who tends to frequently remove/replace a SIM, for example, may be assigned a first trust measure that is positioned at a larger distance from trust space origin 201. Similar to norms 206 and 211, norm 216 represents a point along subscriber identity module tenure axis 215 that is proportional to the subscriber's tendency (or frequency) to replace a SIM. Thus, for a subscriber who frequently replaces a SIM, which may be indicative of increasing risk (or decreasing trust), norm 216 may be positioned, for example, at a considerable distance from trust space origin 201. Conversely, for a subscriber who infrequently replaces a SIM, norm 216 may be located, for example, at a smaller distance from trust space origin 201.

The trust space of FIG. 2 also depicts a first trust measure of password reset occurrences. Thus, a subscriber who tends to infrequently, for example, request a new password may be assigned a first trust measure of password reset occurrences on password reset occurrence axis 220 that is positioned a relatively short distance from trust space origin 201. Conversely, a subscriber who tends to frequently request a new password and/or reset a password, for example, may be assigned a first trust measure of password reset occurrences on password reset occurrence axis 220 that is positioned a greater distance from trust space origin 201. In the example of FIG. 2, norm 221 represents a point along password reset occurrence axis 220 that is, for example, proportional to a subscriber-specific normal or historical measure of password reset occurrences.

It should be noted, as previously mentioned, that FIG. 2 may include additional axes, as represented by other deterministic event axis 225, which may correspond to a number of additional trust events, and claimed subject matter is not limited in this regard. Thus, for example, in a manner that accords with the placement of norms 206, 211, 216, and 221, norm 226 represents a point along axis 225 that is proportional to a subscriber-specific normal or historical measure with respect to other deterministic events. Other deterministic events may include actions undertaken by a subscriber, for example, utilizing a mobile communications device operating at a call source. In particular embodiments, deterministic events may refer to online events as well as off-line events that may be unrelated to a transaction. Examples of deterministic online events, which may correspond to relatively routine events/interactions, may include but not be limited to a subscriber utilizing a mobile communications device to read a machine-readable code, such as a QR code, a barcode, etc. A deterministic online event may include a subscriber downloading content from an Internet website via a browser, for example, which operates on the subscriber's mobile communications device.

A deterministic online event may refer to a subscriber initiating an application for credit, for example, at a location near the subscriber's home, or (conversely) at a location that is widely separated from the subscriber's home, such as a location greater than about 80 km (about 50 miles) from the subscriber's home. In certain embodiments, a subscriber initiating a credit application at a location greater than about 80 km from the subscriber's home may, for example, be indicative of a fraudulent attempt to obtain credit. It should be noted that in other embodiments, a subscriber initiating a credit application at locations other than 80 km from the subscriber home, such as locations greater than 30 km, 40 km, 50 km, 60 km, 100 km, and so forth, may be indicative of a fraudulent attempt to obtain credit, and claimed subject matter is not limited in this respect. In particular embodiments, ascertaining a subscriber's deterministic online events may be utilized to locate norm 226 along axis 225.

As previously noted, deterministic events represented by deterministic event axis 225 may refer to off-online events, which may refer to events undertaken or initiated by a subscriber that do not directly involve a subscriber's mobile communications device. For example, an off-line event may refer to a subscriber receiving a traffic citation, obtaining a gym subscription, or obtaining a security clearance, just to name a few examples, may represent an off-line event unrelated to the transaction, and claimed subject matter is not limited in this respect.

In some embodiments, deterministic events may refer to operations conducted by a mobile device subscriber's affiliated devices, such as a tablet, laptop, and/or desktop computing device. An affiliated device may include a subscriber's interactive television device, such as a device capable of receiving and/or displaying wireless streamed video. An affiliated device may include a subscriber's voice-interactive device, such as a device that plays music responsive to a voice command and/or a device that operates aspects of a subscriber's home responsive to voice commands. In particular embodiments, responsive to ascertaining that an affiliated device is associated, or is at least likely to be associated, with a mobile communications device subscriber, records of the subscriber's interaction with the affiliated device may be utilized to locate norm 226 along axis 225.

To recap, axes (205, 210, 215, 220, and 225) depicted in the trust space of the embodiment of FIG. 2 visually indicate a frequency-type measurement (or a velocity-type measurement) of deterministic events performed, or at least initiated by, a particular subscriber with respect to the subscriber's mobile device. Such deterministic events may occur over a significant period of time, which may include a number of years, or even one or more decades. Norms 206, 211, 216, 221, and 226, positioned on axes 205, 210, 215, 220, and 225 of FIG. 2, provide a measure of, for example, a specific subscriber's historical tendency to perform, or to at least initiate, such occurrences. Historical norms 206, 211, 216, 221, and 226 may be computed, such as by a computing device comprising a processor coupled to a memory device or memory structure, utilizing historical records of deterministic events. Thus, for example, norms representing historical or normal points along such axes may represent subscriber behavior, with respect to a mobile device, over a 10-year period, for example, at least in particular embodiments. During such time, deterministic events may be recorded and tracked in a database for comparison with recently occurring deterministic events.

In FIG. 2, as a visual aid, subscriber-specific behavior norm contour 265 is shown as joining norms 206, 211, 216, 221, and 226. FIG. 2 additionally depicts trust score contour 260, which provides a visual indication of recently occurring deterministic events with respect to a specific subscriber's mobile communications device. For example, with respect to phone number-porting axis 205, a mobile communications device subscriber may be assigned a second trust measure of phone number-porting, which may relate to relatively recent occurrences of number-porting. Thus, for example, a mobile communications device subscriber who, during a recent period of time, has ported his or her phone number less frequently than indicated by historical norm 206 may be assigned a second trust measure of phone number-porting, as indicated at recent porting event point 235, for example. In an example, historical norm 206 of FIG. 2 may indicate a frequency or a velocity of one number-porting per year, while recent porting event point 235 may indicate a velocity of 0.5 number-portings per year. Accordingly, recent porting event point 235 is positioned along phone number-porting axis 205 at a location closer to trust space origin 201 than historical norm 206.

Trust score contour 260, also includes a second trust measure of subscriber tenure, which may relate to recent occurrences of events related to subscriber tenure of a mobile communications device. Thus, a mobile communications device subscriber who, in a relatively recent period of time, has replaced a mobile communications device less frequently than indicated by historical norm 211 may be assigned a second trust measure of subscriber tenure, as indicated at subscriber tenure point 240. In an example, historical norm 211 may indicate a device replacement velocity (or frequency) of one replacement per year, while recent subscriber tenure point 240 may indicate a velocity-type or frequency type measurement of 0.5 device replacements per year. Accordingly, subscriber tenure point 240 is positioned along subscriber tenure axis 210 at a location closer to trust space origin 201 than historical norm 211.

Trust score contour 260, also includes a second trust measure of SIM tenure, which may relate, for example, to recent occurrences of events affecting the SIM of a mobile communications device. Thus, a mobile communications device subscriber who, in a recent period of time, has replaced a SIM less frequently than indicated by historical norm 216, for example, may be assigned a second trust measure of SIM tenure, as indicated at SIM replacement point 245. In an example, historical norm 216 may indicate a SIM replacement velocity of one replacement per year, while recent SIM replacement point 245 may indicate a velocity of 0.5 SIM replacements per year. Accordingly, SIM replacement point 245 is positioned, for example, along subscriber identity module tenure axis 215 at a location closer to trust space origin 201 than historical norm 216.

Trust score contour 260, also includes a second trust measure of password reset occurrences, which may relate, for example, to recent password reset occurrences with respect to a mobile communications device. Thus, a mobile communications device subscriber who, within a recent period of time, has reset a password or obtained a one-time password may be assigned a second trust measure of password reset occurrences, as indicated at password reset occurrence point 250. In an example, historical norm 221 may indicate a velocity-type measurement (or frequency-type measurement) of password reset of one occurrence per year, while recent occurrences of password reset may take place at a velocity of 0.5 password resets per year. Thus, for example, password reset occurrence point 250 is positioned along password reset occurrence axis 220 at a location closer to trust space origin 201 than historical norm 221.

Trust score contour 260 also includes a second trust measure, for example, corresponding to other deterministic events axis 225, with respect to a mobile communications device and/or with respect to devices affiliated with a subscriber of a mobile communications device. Thus, a mobile communications device subscriber who, within a recent period of time, has deviated from behavioral norms associated with other deterministic online events, for example, may be assigned a second trust measure related to historical norm 226. In an example, a mobile communications device subscriber who has recently reduced web browsing sessions with respect to historical norm 226, which may be an indication of a mobile communications device having been stolen by an individual having completely different web browsing habits, may be assigned deterministic event point 255 at a location farther from trust space origin 201. Conversely, in an example, a subscriber who has maintained, over a relatively recent period of time, certain web browsing habits that are consistent with historical norm 226, may be assigned deterministic event point 255 closer to trust space origin 201. Another example of a deterministic online event, which may give rise to deterministic event point 255 being positioned closer to trust space origin 201 (indicating potentially increased trust) or being positioned farther from trust space origin 201 (indicating potentially decreased trust) may include online behavior such as the subscriber's recent use of a mobile communications device to read a machine-readable code. In such an instance, a subscriber's interaction with a machine-readable code that is consistent with the subscriber's historical pattern of interactions may be assigned a deterministic event point positioned closer to origin 201. A subscriber's recent interactions with a machine-readable code that is not consistent with the subscriber's historical pattern of interactions may be assigned a deterministic event point positioned farther from origin 201. Likewise, a subscriber's recent occurrences of engaging in online transactions, which are consistent with the subscriber's historical pattern of performing or initiated online transactions, may result in the subscriber being assigned a deterministic event point closer to origin 201. On the other hand, recent occurrences of a subscriber performing or initiating online transactions that are inconsistent with the subscriber's historical pattern, for example, may result in the subscriber being assigned a deterministic event point farther from origin 201. Other online activities may bring about placement of deterministic event point 255 along axis 225, and claimed subject matter is not limited in this respect.

A mobile communications device subscriber's behavior relative to off-line events may also impact placement of deterministic event point 255 along axis 225. Thus, for example, a subscriber who, over a recent period of time, engages in off-line activities, such as civic activities consistent with historical norm 226 may give rise to deterministic event point 255 being positioned closer to trust space origin 201, thus indicating increased trust. Conversely, a subscriber who, over a recent period of time, engages in off-line activities inconsistent with historical norm 226 may be assigned a deterministic event point 255 being positioned farther from trust space origin 201. Claimed subject matter is intended to embrace all subscriber off-line activities, which may be unrelated to transactions (e.g., financial transactions), virtually without limitation.

A mobile communications device subscriber's behavior involving equipment affiliated with the subscriber, such as tablet computing devices, laptop or desktop computing devices, gaming devices, interactive entertainment devices (e.g., interactive televisions, voice-activated entertainment devices, etc.) may also be assigned deterministic event point 255 positioned closer to trust space origin 201. In an embodiment, a subscriber who maintains a consistent number and/or consistent usage patterns of devices affiliated with the subscriber, or devices likely to be affiliated with the subscriber, for example, may be assigned deterministic event point 255 closer to trust space origin 201 (e.g., to indicate higher trust). Conversely, a subscriber who abruptly changes a number of affiliated devices and/or usage patterns of affiliated devices, for example, may be assigned deterministic event point 255 further from trust space origin 201 (e.g., to indicate lower trust).

It should be noted that, at least in particular embodiments, with respect to devices affiliated with a mobile communications device subscriber, it may be problematic to determine with a degree of certainty whether such affiliated devices are possessed, owned, or at least being utilized by the subscriber. Accordingly, in particular embodiments, it may be sufficient to infer, with at least a reasonable probability, that such affiliated devices are associated with the subscriber. In such instances, it may be useful to compare an Internet protocol (IP) address, for example, of the mobile communications device with the IP address of the putative affiliated device. If it can be determined that a match is present between the mobile communications device and the putative affiliated device, a high probability may exist that an affiliated device is, indeed, associated with a particular mobile communications device subscriber. In other instances, a device having a high probability of being affiliated with a subscriber's mobile communications device may comprise a device that interacts with the same local transceiver (115 of FIG. 1) as the communications device, the same cellular transceiver (110 of FIG. 1) as the communications device, or may be positioned within a prescribed geographical boundary, for example, as the communications device.

Accordingly from the example of FIG. 2, responsive to recently occurring events with respect to a subscriber's mobile communications device, such as recently-occurring number-porting, recent events related to subscriber tenure, recent events relating to subscriber SIM tenure, password reset occurrences, and other deterministic events (involving online activities, off-line activities, and/or affiliated devices), a trust score contour may be formed. Further, in response to deterministic events occurring at frequencies less than historical norms, or, in other instances, at frequencies greater than historical norms (or, in other instances, in accordance with usage patterns not consistent with historical norms), a trust score contour may fall within the boundaries of subscriber-specific behavior norm contour 265. For example, in FIG. 2, trust score contour 260 is shown as falling within the boundaries of behavior norm contour 265. Accordingly, at least in particular embodiments, first trust score measures, relating to historical norms, may be combined with the second trust score measures, which relate to recently occurring events, to form an authorization status of a transaction. In some embodiments, combining a first trust score measure with a second trust score measure may provide an approach toward estimating, with increased accuracy, the risk associated with permitting a particular transaction (e.g., a financial transaction) to proceed. For example, with respect to phone number-porting axis 205, a determination that a mobile communications device subscriber has ported his or her phone (during a recent period of time) at a frequency less than a historical norm (computed over a longer period of time), an example transaction may be permitted to occur. Accordingly, in particular embodiments, combining a first trust score measure with a second trust score measure may permit a trust score to be assigned with increased accuracy with respect to conventional approaches, such as those that do not utilize subscriber-specific historical norms.

Figure 3:
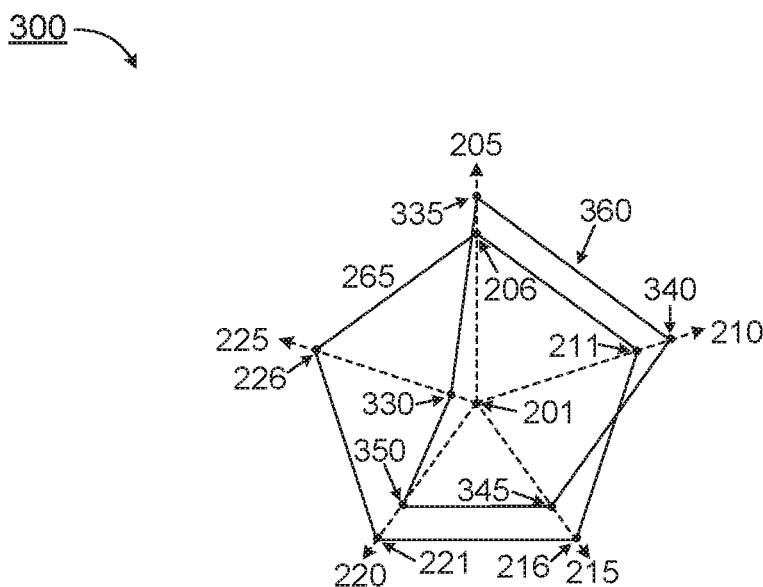
FIG. 3 shows a trust space and a second subscriber-specific trust contour, according to an embodiment.

FIG. 3 shows a trust space and a second subscriber-specific trust contour, according to an embodiment 300. Similar to trust space 200 of FIG. 2, trust measures of FIG. 3 may correspond to measures of behavior, ownership, and/or possession aspects of a mobile communications device (which may include devices affiliated with a mobile communications device). Such devices may be utilized by a subscriber attempting to engage in a transaction, such as a financial transaction, a transaction to permit access to content, etc. In FIG. 3, as a visual aid, subscriber-specific behavior norm contour 265 is shown as joining historical norms 206, 211, 216, 221, and 226. Similar to FIG. 2, historical norms 206, 211, 216, 221, and 226 relate to a subscriber's porting of a mobile device phone number (norm 206), subscriber tenure with respect to a mobile communications device (norm 211), SIM tenure (norm 216), subscriber password reset occurrences (norm 221), and other deterministic events (norm 226).

However, in contrast to the trust space of FIG. 2, at least a portion of trust score contour 360 does not fall within the boundaries of subscriber-specific behavior norm contour 265. For example, with reference to phone number-porting axis 205, recent porting event point 335 is indicated as exceeding historical norm 206. Thus, for example, responsive to historical norm 206 of FIG. 3 corresponding to a frequency of one number-porting per year, recent porting event point 335 may indicate number-porting at a rate of 1.5 events per year. Accordingly, recent porting event point 335 is positioned along phone number-porting axis 205 at a greater distance from trust space origin 201 than historical norm 206. Likewise, in another example pertaining to subscriber tenure axis 210, responsive to historical norm 211 indicating a velocity-type (or frequency-type) measurement of one replacement per year, recent subscriber tenure point 340 may indicate a velocity-type (or frequency-type) measurement of 1.5 device replacements per year. Accordingly, recent subscriber tenure point 340 is positioned along subscriber tenure axis 210 at a greater distance, for example, from trust space origin 201 than historical norm 211. In another example shown in FIG. 3, in response to SIM replacements occurring less frequently than a historical norm, SIM replacement point 345 may be located closer to trust space origin 201 than historical norm 215. In another example shown in FIG. 3, in response to password reset events occurring less frequently than a historical norm, password reset occurrence point 350 may be located closer to trust space origin 201 than historical norm 221. In another example shown in FIG. 3, in response to deterministic events occurring at a similar velocity (or frequency) consistent with historical usage patterns, other deterministic event point 355 may be positioned at a location closer to trust space origin 201 than historical norm 226.

Thus from FIG. 3, responsive to recently occurring events, such as recently occurring subscriber number-porting and replacement of a mobile subscriber device, which occur at frequencies greater than historical norms, an increased potential for fraud may exist. It may be appreciated that, at least in some instances, a potential for fraud may be proportional to the degree of departure of number-porting events, subscriber device replacement events, SIM replacement events, password reset events, other online/off-line/affiliated-device events, etc., as these relate to historical norms. Thus, in particular embodiments, verifying and/or authenticating a subscriber may involve computing, for example, a first trust measure with respect to the historical norms as these pertain to the subscriber's mobile communications device. Verifying and/or authenticating a subscriber may additionally involve computing recent occurrences of second trust measures, which relate to recently occurring events. Further, verifying and/or authenticating the subscriber may further involve combining, for example, the first trust measure and the second trust measure.

In some embodiments, combining a first trust measure (e.g., subscriber-specific behavioral norms with respect to deterministic events) with the second trust measure (e.g., recently-occurring deterministic events) may involve determining a difference between first and second trust measures. For example, responsive to a first trust measure (e.g., a subscriber-specific behavioral norm related to number-porting of a mobile communications device) corresponds to a velocity of number-porting of one time per year, such as over a 10-year period, and a second trust measure (e.g., recent occurrences of mobile communications device porting) corresponds to a velocity of number-porting of one time per year, such as over a recent two-year period), then the difference between the first and second trust measures is zero. In particular embodiments, such a result may indicate that a subscriber's recent behavior is consistent with the subscriber's long-term behavior with respect to porting a telephone number of a mobile communications device.

In another example, responsive to a first trust measure corresponding to a number-porting of one time per year (1/year), determined over a 10-year period, and a second trust measure corresponding to a number-porting of two times within the past one-year period (2/year), then the difference between the first and second trust measures is one number-porting of a mobile communications device per year. It may be appreciated that under certain circumstances, such a result may indicate that a subscriber's recent behavior is not consistent with the subscriber's long-term behavior with respect to porting a telephone number of a mobile communications device. Accordingly, in view of such departure from historical norms, an increased fraud potential may exist.

In some embodiments, in response to relatively small differences between occurrences of recent events and historical norms (e.g., in which recently-occurring deterministic events exceed historical norms), a simple telephone call (or other type of voice communication) between a financial institution, for example, a subscriber attempting to engage in a particular type of financial transaction may be sufficient to permit the transaction to take place. In an example, a mobile communications device subscriber may be permitted to initiate or perform transactions involving relatively minor monetary amounts, such as monetary amounts involved in obtaining premium sports-related content on a limited basis, responsive to verifying or authenticating parameters via a telephone call, or answering a text message, from a financial institution. However, in another example, a mobile communications device subscriber may be permitted to engage in transactions involving larger amounts, such as amounts involved in the purchase of a vehicle, a cash withdrawal greater than a threshold amount, or the like, only after supplying a more comprehensive set of verifying or authenticating parameters via a telephone call with a financial institution. In another example, such as an example involving a transfer of funds to a mobile communications device subscriber, the subscriber may receive a fraction of such funds immediately, perhaps in response to satisfying a first set of authenticating parameters. After a period of time, the subscriber may then receive another fraction of such funds, perhaps in response to satisfying a second set of authenticating parameters.

Figure 4:
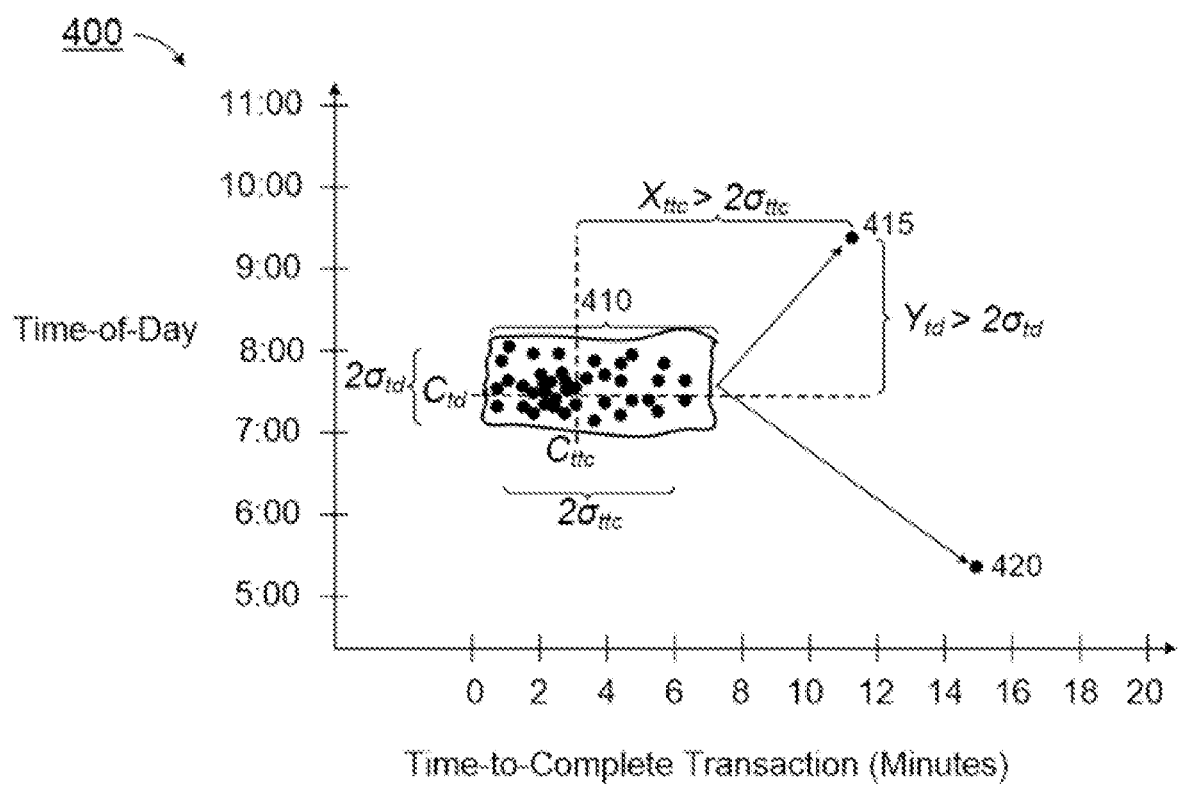
FIG. 4 is a graph showing time-of-day versus time-to-complete a transaction, according to an embodiment.

In the examples of FIG. 3 and FIG. 4, deviations from historical norms with respect to each axis of trust spaces 200 and 300 (e.g., such as phone number-porting axis 205, subscriber tenure axis 210, subscriber identity module tenure axis 215, and so forth) may be treated with substantially equal weight. In such an example, for a trust space having five axes, deviations from historical norms along each axis may be weighted so as to contribute 20% (⅕) of a total combined or aggregated trust measure. However, in particular embodiments, deviations from historical norms with respect to each axis of a trust space, may be weighted differently. For example, in an implementation, phone number-porting (axis 205) may be viewed as representing as a particularly high risk (or low trust) event with respect to other events, such as subscriber tenure (axis 210). For example, deviation from norm 206, such as indicated by recent porting event point 335 may be more heavily weighted than recent subscriber tenure point 340, which deviates from norm 211. In particular embodiments, assigning a first weight value to a first deterministic event and assigning a second weight value to a second deterministic event may provide a more flexible and/or dynamic approach toward assessing an overall trust score to a subscriber.

FIG. 4 is a graph showing time of day versus time-to-complete a transaction, according to an embodiment 400. In the graph of FIG. 4, a grouping of discrete events is displayed within region 410. In an example, the discrete events of region 410 pertain to a subscriber utilizing a mobile communications device to perform (or to at least initiate) a bank transaction, such as a transaction to transfer funds among accounts, deposit funds, withdraw funds, or the like. Accordingly, in the example of FIG. 4, a subscriber may normally perform such banking transactions between the hours of 7:00 AM and 8:00 AM. Further, in most instances, such transactions may consume between about two minutes and about six minutes to complete.

As shown in FIG. 4, a centroid or arithmetic mean corresponding to the time-of-day of the transactions indicated in region 410 is given by $C_{td}$, for example. Similarly, a centroid or arithmetic mean corresponding to the time-to-complete the transactions indicated in region 410 is given by $C_{ttc}$, for example. As shown in FIG. 4, with respect to the time-of-day of the transactions of region 410, a large majority of such transactions (e.g., 2σ or about 95%) of transactions fall within the hours of between 7:00 AM and 8:00 AM. Similarly, with respect to the time-to-completion of the transactions of region 410, a large majority of such transactions (e.g., 2σ or about 95%) of transactions consume between about one and about seven minutes to complete.

However, as is also shown in FIG. 4, outlier transactions 415 and 420 appear to occur well outside of the hours of 7:00 AM and 8:00 AM, and appear to consume durations of much greater than six minutes. For example, outlier transaction 415 appears to occur shortly after 9:00 AM, and to consume approximately 11 minutes to complete. Additionally, outlier transaction 420 appears to occur shortly after 5:00 AM and to consume approximately 15 minutes to complete. Accordingly, outlier transactions 415 and 420 may be indicated as, for example, being potentially fraudulent and thus may warrant some level of verification/authentication. For example, the time-of-day of outlier transaction 415 deviates from the centroid of the time-of-day of transactions shown in region 410 by an amount greater than $2\sigma_{td}$ (e.g., $X_{td} > 2\sigma_{td}$ in FIG. 4). Likewise, the time-to-complete of outlier transaction 415 deviates from the centroid of the time-to-complete of transactions shown in region 410 by an amount greater than $2\sigma_{ttc}$ (e.g., $X_{ttc} > 2\sigma_{ttc}$ in FIG. 4). In particular embodiments, as a time-of-day and/or a time-to-complete of a transaction increases, a potential for fraudulent activity also increases. Thus, for example, outlier transaction 420, represented in FIG. 4 as being located at a larger distance from $C_{td}$ and $C_{ttc}$ than outlier transaction 415, may represent a potential for fraudulent activity greater than that of outlier transaction 415. In particular embodiments, a potential for (or likelihood of) fraud may be proportional (or at least approximately proportional) to the number of standard deviations (a), measured with respect to horizontal and vertical axes, between an outlier event and a centroid corresponding to the arithmetic mean time-of-day and the mean time-to-complete a transaction, substantially in accordance with expression (1), below:

$$P_{FRAUD} \propto K_1 \frac{(\text{Outlier}_{Time-to-complete} - C_{ttc})}{\sigma_{ttc}} + K_2 \frac{(\text{Outlier}_{Time-of-day} - C_{td})}{\sigma_{td}} \quad (1)$$

Thus, as indicated in expression (1) for large deviations of outlier time to complete and/or outlier time-of-day (indicated, for example, as outlier transactions 415/420), normalized by $\sigma_{td}$ and $\sigma_{ttc}$, a probability of fraud ($P_{FRAUD}$) may represent a significant quantity. It may be appreciated that certain outliers, such as time-to-complete, for example, may be weighted differently than other outliers, such as time-of-day. In an example, such differences in weighting ($K_1$ versus $K_2$ in expression (1)) may be indicative of certain fraudulent transactions requiring a greater time-to-complete (perhaps as password guesses are sequentially entered into a login screen) in relation to the time-of-day differences, which may routinely vary in accordance with a subscriber's changing work schedule. It may also be appreciated that a combined trust score measurement, for example, may be formed from $P_{FRAUD}$ computed in accordance with expression (1). A combined trust score measure may provide an approach toward estimating, with increased accuracy, risk associated with permitting a particular transaction (e.g., a financial transaction) to proceed. A combined trust score may be computed substantially in accordance with expression (2), below:

$$\text{Combined Trust} = 1 - P_{FRAUD} \quad (2)$$

Figure 5:
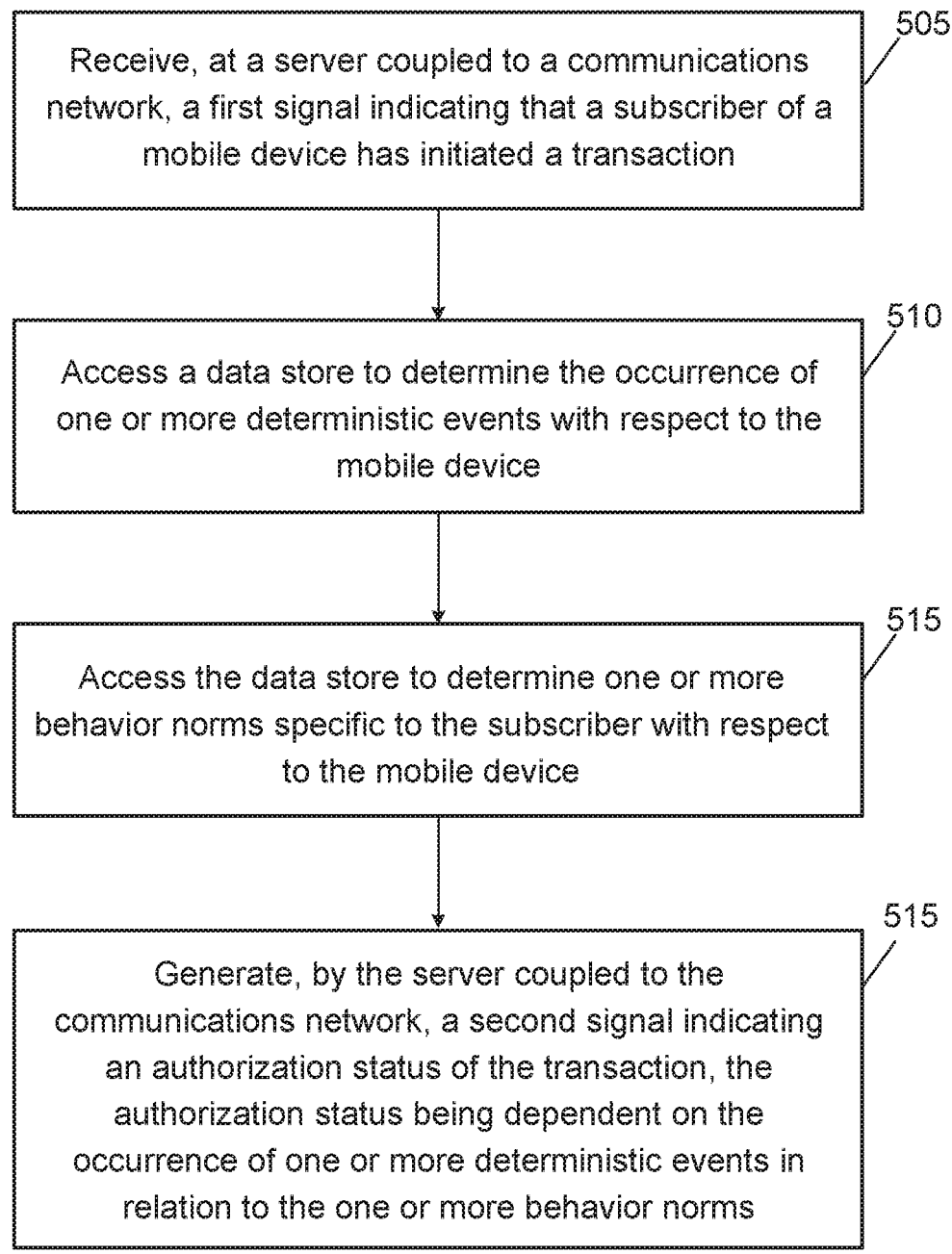
FIG. 5 is a flow diagram illustrating an implementation of transaction authentication utilizing subscriber-specific behaviors, according to an embodiment.

FIG. 5 is a flow diagram illustrating an implementation of transaction authentication utilizing subscriber-specific behaviors, according to an embodiment 500. Embodiment 500 operates to, at least in part, to verify, audit, authorize, and authenticate a party (such as a subscriber) initiating a transaction utilizing behavioral, ownership, and/or possession aspects of a mobile communications device. It should be noted that the disclosed embodiments, such as that of FIG. 5, are intended to embrace variations of the respective figures, including methods that may include actions in addition to those depicted in the figures, actions performed in an order different than those depicted in the figures, as well as methods including fewer steps than those depicted. The method of FIG. 5 begins at 505, which includes receiving, at a server coupled to a communications network, a first signal indicating that a subscriber of a mobile communications device has initiated a transaction. 505 may involve a calling party, such as a mobile communications device subscriber, attempting to initiate a transaction, such as a financial transaction, by contacting a bank, brokerage, or other institution. A mobile communications device subscriber may operate a mobile cellular communications device, a VoIP device, or any other wireless/wireline communications device.

The method of FIG. 5 may continue at 510, which may involve accessing a data store, which may comprise one or more databases, to determine the occurrence of one or more deterministic events with respect to the mobile device. Such deterministic events may include recently occurring events, such as events occurring within a recent one-year period, a recent two-year period, or any other recent period of time that could be utilized to determine a velocity measurement of one or more historical events. Deterministic events may include standalone number-porting events, subscriber mobile device tenure events, SIM removal/replacement events, password reset events, or any other deterministic events with respect to the subscriber's mobile communications device. Deterministic events may include such events occurring over a certain time interval (e.g., a velocity measure of one or more historical events). The method may continue at 515, which may involve accessing a data store at 510, or may involve accessing a different data store. Parameters accessed from a data store at 515 may permit determination of one or more behavioral norms specific to the subscriber with respect to the mobile device. Behavioral norms may relate to deterministic events performed by, or at least initiated by, a subscriber of a mobile communications device over a relatively long period of time, such as three or more years, five or more years, eight or more years, 10 or more years, 15 or more years, or any other relatively large duration.

At 515, the server coupled to the communications network may generate a second signal indicating an authorization status of the transaction. The authorization status may be dependent on the occurrence of one or more deterministic events in relation to the one or more behavioral norms. In particular embodiments, 515 may involve comparing occurrence of recent deterministic events, such as events occurring within a recent one-year period in relation to behavioral norms with respect to events occurring over, for example, a 10-year period. In particular embodiments, 515 may involve computing a centroid representing an arithmetic mean of certain events plotted in a space, such as a two-dimensional space. Responsive to computing a centroid, 515 may additionally include computing one or more standard deviations of events with respect to axes of the space and determining a number of standard deviations between a centroid and an outlier event, such as substantially in accordance with expression (1) discussed in reference to FIG. 4.

Figure 6:
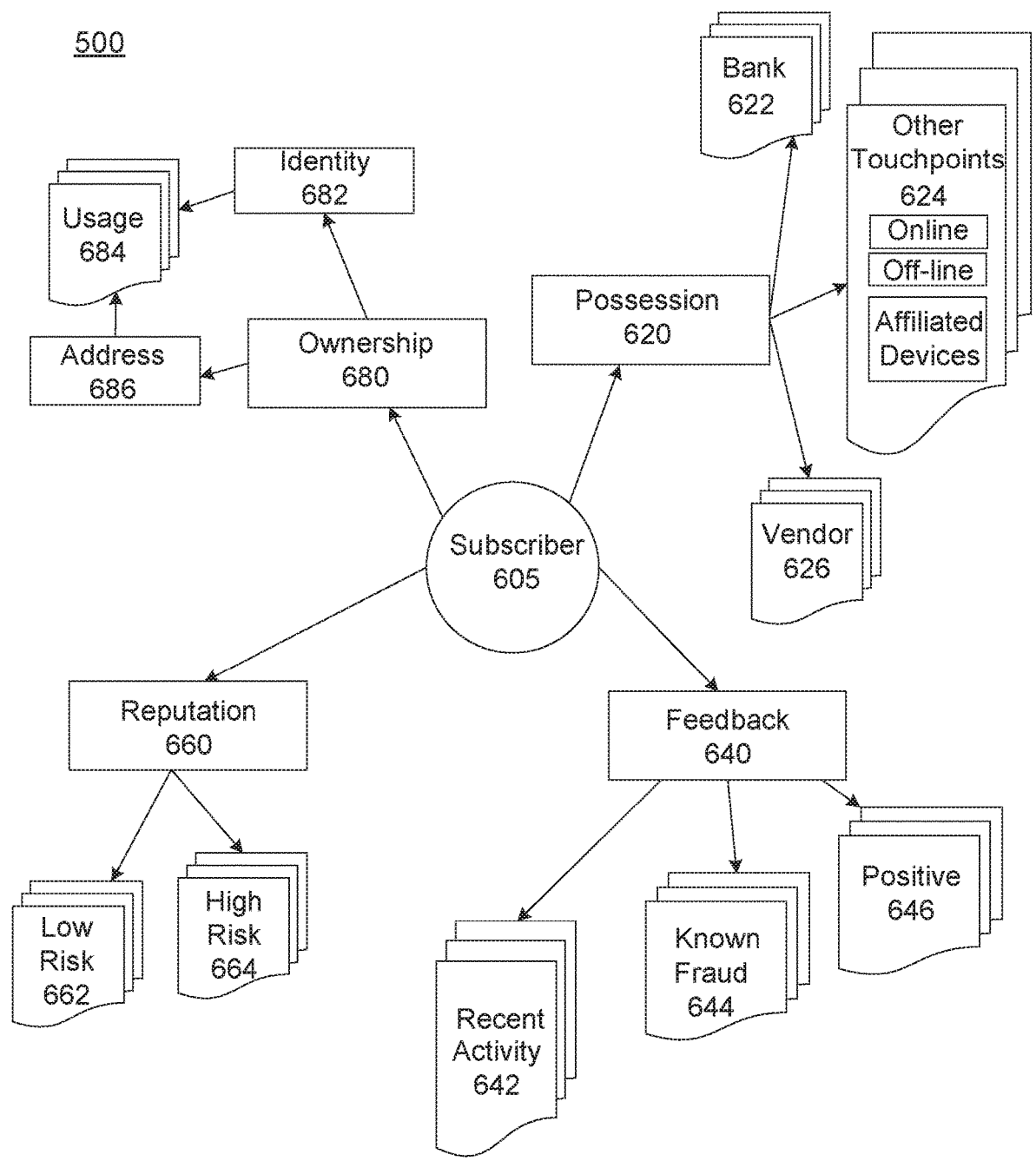
FIG. 6 is a knowledge graph showing various aspects of subscriber trustworthiness, according to an embodiment.

FIG. 6 is a knowledge graph showing various aspects of subscriber trustworthiness, according to an embodiment 600. As shown in FIG. 6, subscriber 605, which may represent a mobile communications device subscriber, may involve aspects of mobile communications device possession 620, feedback 640, reputation 660, and ownership 680. With respect to possession, financial institutions, such as bank 622 as well as vendors, such as vendor 626, may verify and/or authenticate possession of a subscriber mobile device. In addition, other touchpoints 624 may represent additional online interactions with, for example, a communications infrastructure. Such interactions may include, but are not limited to deterministic online events, which may correspond to relatively routine events/interactions. Interactions may include a subscriber utilizing a mobile communications device to read a machine-readable code, such as a QR code, a barcode, etc. A deterministic online event may include a subscriber engaging in an online transaction in connection with an item or service via the subscriber's mobile communications device. A deterministic online event may include a subscriber downloading content from an Internet website via a browser, for example, which operates on the subscriber's mobile communications device.

Other touchpoints 624 may include deterministic off-line events, such as events undertaken or initiated by a subscriber that do not directly involve a subscriber's mobile communications device or may be unrelated to a transaction, such as a financial transaction. As previously noted, deterministic events represented by deterministic event axis 225 may refer to off-online events, which may refer to events undertaken or initiated by a subscriber that do not directly involve a subscriber's mobile communications device. For example, and off-line event may refer to a subscriber receiving a traffic citation, obtaining a gym subscription, or obtaining a security clearance, just to name a few examples, may represent an off-line event that may or may not be related to a transaction.

In particular embodiments, other touchpoints 624 may include operations conducted, or at least initiated, by one or more of a mobile subscriber's affiliated devices, such as a tablet, laptop, and/or desktop computing device. Such touchpoints may involve a subscriber's interactive television device, such as a device capable of receiving and/or displaying wireless streamed video. A touchpoint may involve a subscriber's voice-interactive device, such as a device that plays music responsive to a voice command and/or a device that operates aspects of a subscriber's home responsive to voice commands.

With respect to feedback 640, such feedback may involve recently occurring events, such as recent activities 642, which may involve standalone activities or a velocity of activities having taken place over a relatively recent period of time, such as a few months, one year, two years, and so forth. Known fraud 644 may, at least in particular embodiments, qualify as a deterministic event, which may operate to lower a subscriber-specific trust score. On the other hand, positive (646) trust scores, perhaps consistently assigned to a mobile communications device subscriber, may operate to enhance or raise a subscriber-specific trust score.

With respect to reputation aspects 660 of subscriber 605, a mobile communications device subscriber may, responsive to a history of being assigned a relatively low trust scores, may be designated as a high risk subscriber 664, at least as such pertains to performing, or at least initiating, certain types of transactions (e.g., financial transactions). Conversely, in an example, responsive to a history of being assigned relatively high trust scores, a subscriber may be designated as a low risk subscriber 662, at least as such pertains to performing, or at least initiating, certain types of transactions. With respect to ownership 680 deterministic aspects of a mobile communications device may relate to verifying a mobile device subscriber's physical address 686 and usage patterns 684. Deterministic aspects of a mobile communications device may also relate to verifying a mobile device subscriber's identity 682.

Figure 7:
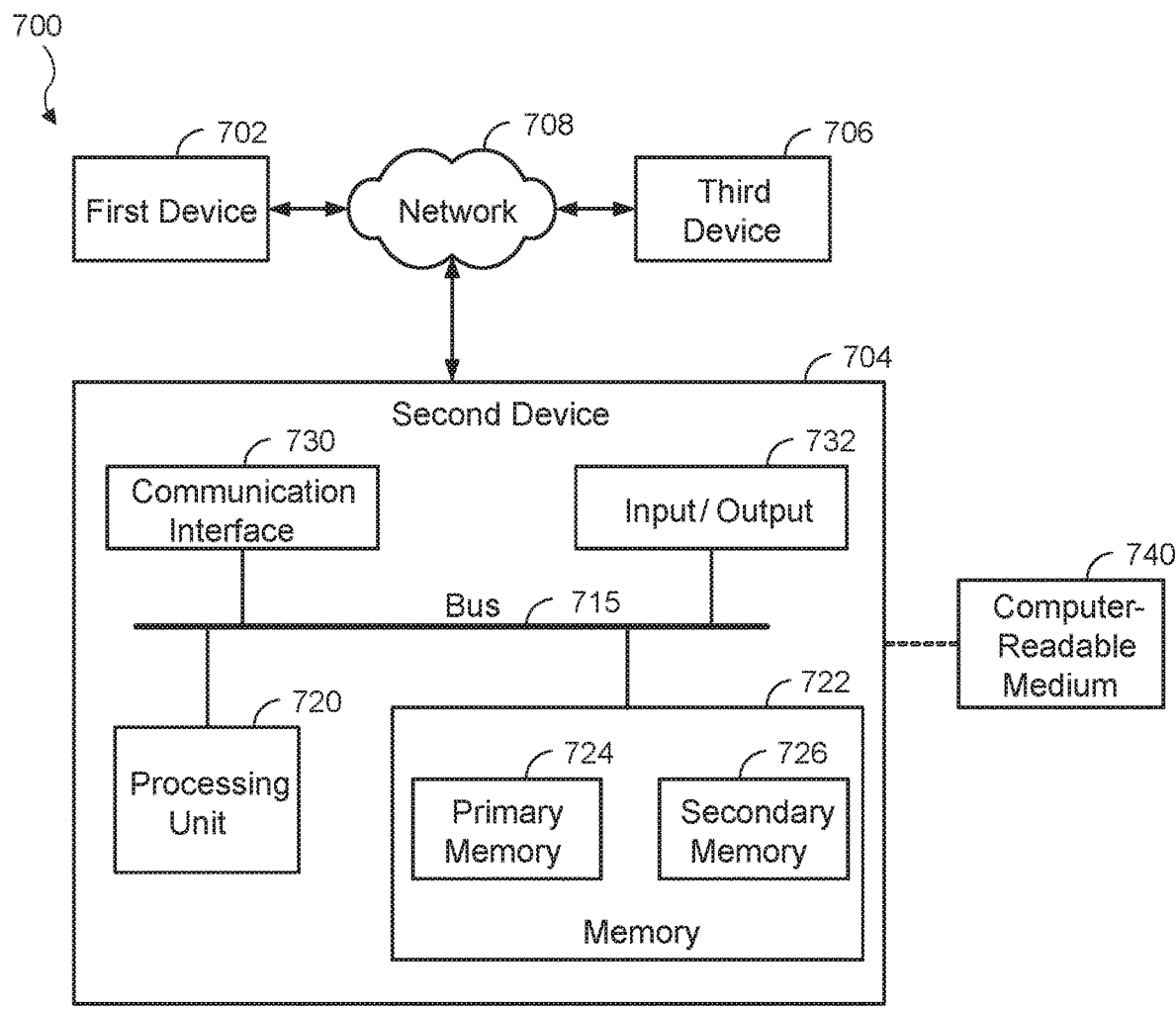
FIG. 7 is a diagram showing a computing environment, according to an embodiment.

FIG. 7 is a diagram showing a computing environment 700. In the embodiment of FIG. 7, first and third devices 702 and 706 may be capable of rendering a graphical user interface (GUI) for a network device, such as server device 140 of FIG. 1, so that a subscriber utilizing a mobile communications device may engage in system use. Device 704 may potentially serve a similar function in this illustration. Likewise, in FIG. 7, computing device 702 ('first device' in FIG. 7) may interface with computing device 704 ('second device' in FIG. 7), which may, for example, also comprise features of a client computing device and/or a server computing device, in an embodiment. Processor (e.g., processing device) 720 and memory 722, which may comprise primary memory 724 and secondary memory 726, may communicate by way of a communication interface 725, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 704, as depicted in FIG. 7, is merely one example, and claimed subject matter is not limited in scope to this particular example.

In FIG. 7, computing device 702 may provide one or more sources of executable computer instructions in the form of physical states and/or signals (e.g., stored in memory states), for example. Computing device 702 may communicate with computing device 704 by way of a network connection, such as via network 708, for example. As previously mentioned, a connection, while physical, may be virtual while not necessarily being tangible. Although computing device 704 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage mechanism. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may be utilized to store a program of executable computer instructions. For example, processor 720 may fetch executable instructions from memory and proceed to execute the fetched instructions. Memory 722 may also comprise a memory controller for accessing device readable-medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described. Generated signals may also be stored in memory, also previously suggested.

Memory 722 may store electronic files and/or electronic documents, such as relating to one or more users, and may also comprise a computer-readable medium that may carry and/or make accessible content, including code and/or instructions, for example, executable by processor 720 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 720 may comprise one or more circuits, such as digital circuits, to perform at least a portion of a computing procedure and/or process. By way of example, but not limitation, processor 720 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 704 as including a component 732 operable with input/output devices, and communication bus 715, for example, so that signals and/or states may be appropriately communicated between devices, such as device 704 and an input device and/or device 704 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter

What is claimed is:

1. A method comprising:
receiving, by a server from an authorizing entity, a first signal indicating that a subscriber of a mobile device has initiated a transaction;
retrieving, by the server, a set of deterministic events related to the mobile device, wherein:
the set of deterministic events is stored in a data store,
the set of deterministic events relates to: (i) a subscriber identifier possession, (ii) a usage, (iii) an ownership tenure, and/or (iv) a subscriber identity module removal and/or replacement frequency, and
each event in the set of deterministic events occurs during a period of time;
retrieving, by the server, a set of behavior norms specific to the subscriber related to the mobile device, wherein each behavior norm in the set of behavior norms relates to a set of historical events; and
responsive to calculating, by the server, a first trust score contour for the mobile device consistent with a risk below a historical norm, transmitting, by the server to the authorizing entity, a second signal indicating an approval of the transaction, wherein:
the first trust score contour is based, at least in part, on a comparison of the set of behavior norms and the set of deterministic events.

2. The method of claim 1, further comprising:
responsive to an occurrence of a first deterministic event related to the mobile device, computing, by the server, a second trust score contour based, at least in part, on combining the first trust score contour with a comparison of the first deterministic event to the set of behavior norms and combining; and
responsive to the second trust score contour being consistent with the risk below the historical norm, transmitting, by the server to the authorizing entity, a second signal indicating an approval of the transaction.

3. The method of claim 2, wherein a set of weights corresponds to the set of deterministic events.

4. The method of claim 3, wherein a first weight in the set of weights corresponding to the first deterministic event is weighted differently than at least a second weight in the set of weights corresponding to a second deterministic event in the set of deterministic events.

5. The method of claim 1, wherein a first deterministic event in the set of deterministic events corresponds to a real-time event.

6. The method of claim 1, wherein the set of deterministic events corresponds to at least one of the following: a velocity-type measure; a tenure-type measure; a real-time event measure; or any combination thereof.

7. The method of claim 1, wherein retrieving, by the server, the set of behavior norms further to retrieve one or more additional historical events that correspond to one or more of the subscriber's off-line activities unrelated to the transaction.

8. The method of claim 7, wherein the one or more additional historical events comprise at least one of the following: reading, via a device affiliated with the subscriber, a machine-readable code; accessing content from a device external to the device affiliated with the subscriber; communicating with a wireless access point affiliated with the subscriber; or any combination thereof.

9. The method of claim 1, wherein the set of behavior norms specific to the subscriber related to the mobile device are at least partially derived from a record of one or more historical events performed by the subscriber related to the mobile device.

10. A server, comprising:
at least one processor communicatively coupled to at least one memory to:
initiate reception, from an authorizing entity, of at least a first signal to indicate that a subscriber of a mobile device has initiated a transaction;
retrieve a set of deterministic events related to the mobile device, wherein:
the set of deterministic events is stored in a data store,
the set of deterministic events relates to: (i) a subscriber identifier possession, (ii) a usage, (iii) an ownership tenure, and/or (iv) a subscriber identity module removal and/or replacement frequency, and
each event in the set of deterministic events occurs during a period of time;
retrieve a set of behavior norms specific to the subscriber related to the mobile device, wherein each behavior norm in the set of behavior norms relates to a set of historical events; and
responsive to calculating a first trust score contour for the mobile device consistent with a risk below a historical norm, initiate transmission to the authorizing entity approval of the transaction, wherein:
the first trust score contour is based, at least in part, on a comparison of the set of behavior norms and the set of deterministic events.

11. The server of claim 10, wherein the data store comprises:
a first database to store records relevant to the set of deterministic events related to the mobile device; and
a second database to store records relevant to the set of behavior norms specific to the subscriber related to the mobile device.

12. The server of claim 10, wherein a deterministic event of the set of deterministic events corresponds to one or more standalone deterministic events.

13. The server of claim 10, wherein the one or more deterministic events correspond to at least one of the following: a velocity-type measure; a tenure-type measure; a real-time event-type measure; or any combination thereof.

14. The server of claim 10, wherein the set of historical events comprise one of the following: reading, via a device affiliated with the subscriber, a machine-readable code; accessing content from a device external to the device affiliated with the subscriber; and communicating with a wireless access point affiliated with the subscriber.

15. The server of claim 10, wherein at least one of the set of deterministic events corresponds to the subscriber initiating an application for credit at a geographical location that is separated from the subscriber's home by at least 30 km.

16. A method comprising:
receiving, by a server from an authorizing entity, a first signal indicating that a subscriber of a mobile device has initiated a transaction;
retrieving, by the server, a set of deterministic events related to the mobile device, wherein:
the set of deterministic events is stored in a data store,
the set of deterministic events relates to: (i) a subscriber identifier possession, (ii) a usage, (iii) an ownership tenure, and/or (iv) a subscriber identity module removal and/or replacement frequency, and each event in the set of deterministic events occurs during a period of time;

retrieving, by the server, a set of behavior norms specific to the subscriber related to the mobile device, wherein each behavior norm in the set of behavior norms relates to a set of historical events; and responsive to calculating, by the server, a first trust score contour for the mobile device consistent with a risk above a historical norm, transmitting, by the server to the authorizing entity, a second signal indicating a disapproval of the transaction, wherein:

the first trust score contour is based, at least in part, on a comparison of the set of behavior norms and the set of deterministic events.

17. The method of claim 16, further comprising:

responsive to an occurrence of a first deterministic event related to the mobile device, computing, by the server, a second trust score contour based, at least in part, on combining the first trust score contour with a comparison of the first deterministic event to the set of behavior norms and combining; and responsive to the second trust score contour being consistent with the risk above the historical norm, transmitting, by the server to the authorizing entity, a second signal indicating a disapproval of the transaction.

18. The method of claim 17, wherein a set of weights corresponds to the set of deterministic events.

19. The method of claim 18, wherein a first weight in the set of weights corresponding to the first deterministic event is weighted differently than at least a second weight in the set of weights corresponding to a second deterministic event in the set of deterministic events.

20. The method of claim 16, wherein a first deterministic event in the set of deterministic events corresponds to a real-time event.

\* \* \* \* \*